(12) United States Patent
Pervan

(10) Patent No.: US 10,640,989 B2
(45) Date of Patent: May 5, 2020

(54) MECHANICAL LOCKING OF FLOOR PANELS

(71) Applicant: VALINGE INNOVATION AB, Viken (SE)

(72) Inventor: Darko Pervan, Viken (SE)

(73) Assignee: VALINGE INNOVATION AB, Viken (SE)

( * ) Notice: Subject to any disclaimer, the term of this patent is extended or adjusted under 35 U.S.C. 154(b) by 0 days.

(21) Appl. No.: 14/503,780

(22) Filed: Oct. 1, 2014

(65) Prior Publication Data
US 2015/0013260 A1    Jan. 15, 2015

Related U.S. Application Data

(63) Continuation of application No. 11/952,212, filed on Dec. 7, 2007, now Pat. No. 8,869,485, which is a
(Continued)

(30) Foreign Application Priority Data

Dec. 8, 2006 (SE) ...................... 0602645

(51) Int. Cl.
*E04F 15/02*  (2006.01)
*E04B 1/38*   (2006.01)
(Continued)

(52) U.S. Cl.
CPC .......... *E04F 15/02038* (2013.01); *E04B 1/38* (2013.01); *E04B 5/00* (2013.01);
(Continued)

(58) Field of Classification Search
CPC ...... E04B 1/38; E04B 5/00; E04C 2/38; E04F 15/02; E04F 15/02038; E04F 2201/0153;
(Continued)

(56) References Cited

U.S. PATENT DOCUMENTS

| 87,853 A | 3/1869 | Kappes |
| 108,068 A | 10/1870 | Utley |

(Continued)

FOREIGN PATENT DOCUMENTS

| CA | 2456513 A1 | 2/2003 | |
| CA | 2501898 A1 * | 11/2005 | .............. E04F 21/22 |

(Continued)

OTHER PUBLICATIONS

U.S. Appl. No. 15/048,252, Darko Pervan and Tony Pervan, filed Feb. 19, 2016.

(Continued)

*Primary Examiner* — Jeanette E Chapman
(74) *Attorney, Agent, or Firm* — Buchanan Ingersoll & Rooney P.C.

(57) ABSTRACT

Floor panels (1, 1') are shown, which are provided with a mechanical locking system on long (5a, 5b) and short edges (4a, 4b) allowing installation with angling of long edges and where the short edge locking system has a displaceable tongue that is displaceable essentially in one direction from an inner unlocked position to an final locked position.

11 Claims, 26 Drawing Sheets

Related U.S. Application Data continuation of application No. PCT/SE2007/000836, filed on Sep. 24, 2007.

(60) Provisional application No. 60/869,181, filed on Dec. 8, 2006.

(51) Int. Cl.
*E04B 5/00* (2006.01)
*E04C 2/38* (2006.01)
*F16B 5/00* (2006.01)

(52) U.S. Cl.
CPC ............... *E04C 2/38* (2013.01); *E04F 15/02* (2013.01); *E04F 2201/0115* (2013.01); *E04F 2201/0138* (2013.01); *E04F 2201/0146* (2013.01); *E04F 2201/0153* (2013.01); *E04F 2201/0169* (2013.01); *E04F 2201/0176* (2013.01); *E04F 2201/0541* (2013.01); *E04F 2201/0547* (2013.01); *E04F 2201/0552* (2013.01); *E04F 2201/0588* (2013.01); *F16B 5/008* (2013.01)

(58) Field of Classification Search
CPC ...... E04F 2201/0155; E04F 2201/0138; E04F 2201/0146; E04F 2201/0169; E04F 2201/0176; E04F 2201/0588; E04F 2201/0552; E04F 2201/0541; E04F 2201/0547; F16B 5/008
USPC ........................................................ 52/588.1
See application file for complete search history.

(56) References Cited

U.S. PATENT DOCUMENTS

| | | |
|---|---|---|
| 124,228 A | 3/1872 | Stuart |
| 213,740 A | 4/1879 | Conner |
| 261,030 A | 7/1882 | Orcutt |
| 274,354 A | 3/1883 | McCarthy et al. |
| 301,775 A | 7/1884 | Thompson |
| 316,176 A | 4/1885 | Ransom |
| 526,044 A | 9/1894 | Merrill |
| 634,581 A | 10/1899 | Miller |
| 861,911 A | 7/1907 | Stewart |
| 917,352 A | 4/1909 | Palmer |
| 1,194,636 A | 8/1916 | Joy |
| 1,352,620 A | 9/1920 | Onsrud |
| 1,723,306 A | 8/1929 | Sipe |
| 1,743,492 A | 1/1930 | Sipe |
| 1,809,393 A | 6/1931 | Rockwell |
| 1,902,716 A | 3/1933 | Newton |
| 1,911,598 A | 5/1933 | Ashmun |
| 2,005,647 A | 6/1935 | Crouch |
| 2,026,511 A | 12/1935 | Storm |
| 2,027,292 A | 1/1936 | Rockwell |
| 2,054,828 A | 9/1936 | Melde |
| 2,110,728 A | 3/1938 | Hoggatt |
| 2,204,675 A | 6/1940 | Grunert |
| 2,266,464 A | 12/1941 | Kraft |
| 2,277,758 A | 3/1942 | Hawkins |
| 2,430,200 A | 11/1947 | Wilson |
| 2,571,861 A | 10/1951 | Gegumis |
| 2,596,280 A | 5/1952 | Nystrom |
| 2,732,706 A | 1/1956 | Friedman |
| 2,740,167 A | 4/1956 | Rowley |
| 2,791,247 A | 5/1957 | Gerson |
| 2,858,584 A | 11/1958 | Gaines |
| 2,863,185 A | 12/1958 | Riedi |
| 2,865,058 A | 12/1958 | Andersson |
| 2,876,812 A | 3/1959 | Waldron |
| 2,889,016 A | 6/1959 | Warren |
| 3,023,681 A | 3/1962 | Worson |
| 3,077,703 A | 2/1963 | Bergstrom |
| 3,082,802 A | 3/1963 | Dickson et al. |
| 3,099,110 A | 7/1963 | Spaight |
| 3,147,522 A | 9/1964 | Schumm |
| 3,172,237 A | 3/1965 | Bradley |
| 3,187,612 A | 6/1965 | Hervey |
| 3,271,787 A | 9/1966 | Clary |
| 3,276,797 A | 10/1966 | Humes, Jr. |
| 3,325,585 A | 6/1967 | Brenneman |
| 3,331,180 A | 7/1967 | Vissing et al. |
| 3,378,958 A | 4/1968 | Parks et al. |
| 3,396,640 A | 8/1968 | Fujihara |
| 3,512,324 A | 5/1970 | Reed |
| 3,517,927 A | 6/1970 | Kennel |
| 3,526,071 A | 9/1970 | Watanabe |
| 3,535,844 A | 10/1970 | Glaros |
| 3,572,224 A | 3/1971 | Perry |
| 3,579,941 A | 5/1971 | Tibbals |
| 3,626,822 A | 12/1971 | Koster |
| 3,640,191 A | 2/1972 | Hendrich |
| 3,720,027 A | 3/1973 | Christensen |
| 3,722,379 A | 3/1973 | Koester |
| 3,731,445 A | 5/1973 | Hoffmann et al. |
| 3,742,669 A | 7/1973 | Mansfeld |
| 3,760,547 A | 9/1973 | Brenneman |
| 3,760,548 A | 9/1973 | Sauer et al. |
| 3,764,767 A | 10/1973 | Randolph |
| 3,774,660 A | 11/1973 | Morey et al. |
| 3,778,954 A | 12/1973 | Meserole |
| 3,817,305 A | 6/1974 | Gibbs |
| 3,849,235 A | 11/1974 | Gwynne |
| 3,913,642 A | 10/1975 | Porter |
| 3,919,820 A | 11/1975 | Green |
| 3,950,915 A | 4/1976 | Cole |
| 3,986,543 A | 10/1976 | Slayton et al. |
| 3,994,609 A | 11/1976 | Puccio |
| 4,007,767 A | 2/1977 | Colledge |
| 4,007,994 A | 2/1977 | Brown |
| 4,030,852 A | 6/1977 | Hein |
| 4,037,377 A | 7/1977 | Howell et al. |
| 4,041,665 A | 8/1977 | de Munck |
| 4,064,571 A | 12/1977 | Phipps |
| 4,080,086 A | 3/1978 | Watson |
| 4,082,129 A | 4/1978 | Morelock |
| 4,100,710 A | 7/1978 | Kowallik |
| 4,104,840 A | 8/1978 | Heintz et al. |
| 4,107,892 A | 8/1978 | Bellem |
| 4,113,399 A | 9/1978 | Hansen, Sr. et al. |
| 4,151,869 A | 5/1979 | Halloran et al. |
| 4,154,041 A | 5/1979 | Namy |
| 4,169,688 A | 10/1979 | Toshio |
| RE30,154 E | 11/1979 | Jarvis |
| 4,196,554 A | 4/1980 | Anderson |
| 4,227,430 A | 10/1980 | Janssen et al. |
| 4,299,070 A | 11/1981 | Oltmanns |
| 4,304,083 A | 12/1981 | Anderson |
| 4,426,820 A | 1/1984 | Terbrack et al. |
| 4,447,172 A | 5/1984 | Galbreath |
| 4,512,131 A | 4/1985 | Laramore |
| 4,599,841 A | 7/1986 | Haid |
| 4,622,784 A | 11/1986 | Black |
| 4,648,165 A | 3/1987 | Whitehorne |
| 4,819,932 A | 4/1989 | Trotter, Jr. |
| 4,948,716 A | 8/1990 | Mihayashi et al. |
| 5,007,222 A | 4/1991 | Raymond |
| 5,026,112 A | 6/1991 | Rice |
| 5,071,282 A | 12/1991 | Brown |
| 5,135,597 A | 8/1992 | Barker |
| 5,148,850 A | 9/1992 | Urbanick |
| 5,173,012 A | 12/1992 | Ortwein et al. |
| 5,182,892 A | 2/1993 | Chase |
| 5,247,773 A | 9/1993 | Weir |
| 5,272,850 A | 12/1993 | Mysliwiec et al. |
| 5,274,979 A | 1/1994 | Tsai |
| 5,295,341 A | 3/1994 | Kajiwara |
| 5,344,700 A | 9/1994 | McGath et al. |
| 5,348,778 A | 9/1994 | Knipp et al. |
| 5,373,674 A | 12/1994 | Winter, IV |
| 5,465,546 A | 11/1995 | Buse |
| 5,485,702 A | 1/1996 | Sholton |
| 5,502,939 A | 4/1996 | Zadok et al. |

(56) References Cited

U.S. PATENT DOCUMENTS

| | | |
|---|---|---|
| 5,548,937 A | 8/1996 | Shimonohara |
| 5,577,357 A | 11/1996 | Civelli |
| 5,598,682 A | 2/1997 | Haughian |
| 5,618,602 A | 4/1997 | Nelson |
| 5,634,309 A | 6/1997 | Polen |
| 5,658,086 A | 8/1997 | Brokaw et al. |
| 5,694,730 A | 12/1997 | Del Rincon et al. |
| 5,755,068 A | 5/1998 | Ormiston |
| 5,860,267 A | 1/1999 | Pervan |
| 5,899,038 A | 5/1999 | Stroppiana |
| 5,910,084 A * | 6/1999 | Koike ............... E06B 3/16 52/204.1 |
| 5,950,389 A | 9/1999 | Porter |
| 5,970,675 A | 10/1999 | Schray |
| 6,006,486 A | 12/1999 | Moriau et al. |
| 6,029,416 A | 2/2000 | Andersson |
| 6,052,960 A | 4/2000 | Yonemura |
| 6,065,262 A | 5/2000 | Motta |
| 6,164,349 A | 12/2000 | Hsieh |
| 6,164,351 A | 12/2000 | Weathers |
| 6,164,618 A | 12/2000 | Yonemura |
| 6,173,548 B1 | 1/2001 | Hamar et al. |
| 6,182,410 B1 | 2/2001 | Pervan |
| 6,203,653 B1 | 3/2001 | Seidner |
| 6,210,512 B1 | 4/2001 | Jones |
| 6,254,301 B1 | 7/2001 | Hatch |
| 6,295,779 B1 | 10/2001 | Canfield |
| 6,314,701 B1 | 11/2001 | Meyerson |
| 6,332,733 B1 | 12/2001 | Hamberger et al. |
| 6,339,908 B1 | 1/2002 | Chuang |
| 6,345,481 B1 | 2/2002 | Nelson |
| 6,358,352 B1 | 3/2002 | Schmidt |
| 6,363,677 B1 | 4/2002 | Chen et al. |
| 6,385,936 B1 | 5/2002 | Schneider |
| 6,386,250 B1 | 5/2002 | Liu |
| 6,418,683 B1 | 7/2002 | Martensson et al. |
| 6,446,413 B1 | 9/2002 | Gruber |
| 6,449,918 B1 | 9/2002 | Nelson |
| 6,450,235 B1 | 9/2002 | Lee |
| 6,490,836 B1 | 12/2002 | Moriau et al. |
| 6,505,452 B1 | 1/2003 | Hannig |
| 6,546,691 B2 | 4/2003 | Leopolder |
| 6,553,724 B1 | 4/2003 | Bigler |
| 6,576,079 B1 | 6/2003 | Kai |
| 6,584,747 B2 | 7/2003 | Kettler et al. |
| 6,588,166 B2 | 7/2003 | Martensson |
| 6,591,568 B1 | 7/2003 | Pålsson |
| 6,601,359 B2 | 8/2003 | Olofsson |
| 6,617,009 B1 | 9/2003 | Chen et al. |
| 6,647,689 B2 | 11/2003 | Pletzer et al. |
| 6,647,690 B1 | 11/2003 | Martensson |
| 6,651,400 B1 | 11/2003 | Murphy |
| 6,670,019 B2 | 12/2003 | Andersson |
| 6,672,030 B2 | 1/2004 | Schulte |
| 6,681,820 B2 | 1/2004 | Olofsson |
| 6,682,254 B1 | 1/2004 | Olofsson et al. |
| 6,684,592 B2 | 2/2004 | Martin |
| 6,685,391 B1 | 2/2004 | Gideon |
| 6,729,091 B1 | 5/2004 | Martensson |
| 6,763,643 B1 | 7/2004 | Martensson |
| 6,766,622 B1 | 7/2004 | Thiers |
| 6,769,219 B2 | 8/2004 | Schwitte et al. |
| 6,769,835 B2 | 8/2004 | Stridsman |
| 6,802,166 B1 | 10/2004 | Durnberger |
| 6,804,926 B1 | 10/2004 | Eisermann |
| 6,808,777 B2 | 10/2004 | Andersson et al. |
| 6,854,235 B2 | 2/2005 | Martensson |
| 6,862,857 B2 | 3/2005 | Tychsen |
| 6,865,855 B2 | 3/2005 | Knauseder |
| 6,874,291 B1 | 4/2005 | Weber |
| 6,880,307 B2 | 4/2005 | Schwitte et al. |
| 6,948,716 B2 | 9/2005 | Drouin |
| 7,021,019 B2 | 4/2006 | Knauseder |
| 7,040,068 B2 | 5/2006 | Moriau et al. |
| 7,051,486 B2 | 5/2006 | Pervan |
| 7,108,031 B1 | 9/2006 | Secrest |
| 7,121,058 B2 | 10/2006 | Pålsson |
| 7,152,383 B1 | 12/2006 | Wilkinson et al. |
| 7,156,383 B1 * | 1/2007 | Jacobs ................. E04F 21/22 254/11 |
| 7,188,456 B2 | 3/2007 | Knauseder |
| 7,219,392 B2 | 5/2007 | Mullet et al. |
| 7,251,916 B2 | 8/2007 | Konzelmann et al. |
| 7,257,926 B1 | 8/2007 | Kirby |
| 7,337,588 B1 | 3/2008 | Moebus |
| 7,377,081 B2 | 5/2008 | Ruhdorfer |
| 7,451,578 B2 | 11/2008 | Hannig |
| 7,454,875 B2 | 11/2008 | Pervan et al. |
| 7,516,588 B2 | 4/2009 | Pervan |
| 7,517,427 B2 | 4/2009 | Sjoberg et al. |
| 7,520,092 B2 | 4/2009 | Showers et al. |
| 7,533,500 B2 | 5/2009 | Morton et al. |
| 7,556,849 B2 | 7/2009 | Thompson et al. |
| 7,568,322 B2 | 8/2009 | Pervan |
| 7,584,583 B2 | 9/2009 | Bergelin et al. |
| 7,591,116 B2 | 9/2009 | Thiers et al. |
| 7,614,197 B2 | 11/2009 | Nelson |
| 7,617,651 B2 | 11/2009 | Grafenauer |
| 7,621,092 B2 | 11/2009 | Groeke et al. |
| 7,634,884 B2 | 12/2009 | Pervan |
| 7,637,068 B2 | 12/2009 | Pervan |
| 7,644,553 B2 | 1/2010 | Knauseder |
| 7,644,742 B2 | 1/2010 | Burkholder |
| 7,654,055 B2 | 2/2010 | Ricker |
| 7,677,005 B2 | 3/2010 | Pervan |
| 7,716,889 B2 | 5/2010 | Pervan |
| 7,721,503 B2 | 5/2010 | Pervan et al. |
| 7,726,088 B2 | 6/2010 | Muehlebach |
| 7,748,176 B2 | 7/2010 | Harding et al. |
| 7,757,452 B2 | 7/2010 | Pervan |
| 7,802,411 B2 | 9/2010 | Pervan |
| 7,806,624 B2 | 10/2010 | McLean et al. |
| 7,841,144 B2 * | 11/2010 | Pervan ................. E04F 15/02 52/391 |
| 7,841,145 B2 | 11/2010 | Pervan et al. |
| 7,841,150 B2 | 11/2010 | Pervan |
| 7,856,789 B2 | 12/2010 | Eisermann |
| 7,861,482 B2 | 1/2011 | Pervan et al. |
| 7,866,110 B2 | 1/2011 | Pervan |
| 7,908,815 B2 | 3/2011 | Pervan et al. |
| 7,908,816 B2 | 3/2011 | Grafenauer |
| 7,930,862 B2 | 4/2011 | Bergelin et al. |
| 7,954,295 B2 | 6/2011 | Pervan |
| 7,980,041 B2 | 7/2011 | Pervan |
| 8,001,741 B2 | 8/2011 | Duernberger |
| 8,006,458 B1 | 8/2011 | Olofsson et al. |
| 8,033,074 B2 | 10/2011 | Pervan |
| 8,042,311 B2 | 10/2011 | Pervan |
| 8,061,104 B2 | 11/2011 | Pervan |
| 8,079,196 B2 | 12/2011 | Pervan |
| 8,112,967 B2 | 2/2012 | Pervan et al. |
| 8,171,692 B2 | 5/2012 | Pervan |
| 8,181,416 B2 | 5/2012 | Pervan et al. |
| 8,234,830 B2 | 8/2012 | Pervan et al. |
| 8,245,478 B2 | 8/2012 | Bergelin |
| 8,281,549 B2 | 10/2012 | Du |
| 8,302,367 B2 | 11/2012 | Schulte |
| 8,341,914 B2 | 1/2013 | Pervan et al. |
| 8,341,915 B2 * | 1/2013 | Pervan ............. E04F 15/02038 52/396.04 |
| 8,353,140 B2 | 1/2013 | Pervan et al. |
| 8,359,805 B2 | 1/2013 | Pervan et al. |
| 8,381,477 B2 | 2/2013 | Pervan et al. |
| 8,387,327 B2 | 3/2013 | Pervan |
| 8,448,402 B2 | 5/2013 | Pervan et al. |
| 8,499,521 B2 | 8/2013 | Pervan et al. |
| 8,505,257 B2 | 8/2013 | Boo et al. |
| 8,511,031 B2 | 8/2013 | Bergelin et al. |
| 8,528,289 B2 | 9/2013 | Pervan et al. |
| 8,544,230 B2 | 10/2013 | Pervan |
| 8,544,233 B2 | 10/2013 | Pålsson |
| 8,544,234 B2 | 10/2013 | Pervan et al. |
| 8,572,922 B2 | 11/2013 | Pervan |
| 8,578,675 B2 | 11/2013 | Palsson et al. |

(56) References Cited

U.S. PATENT DOCUMENTS

| | | |
|---|---|---|
| 8,596,013 B2 | 12/2013 | Boo |
| 8,627,862 B2 | 1/2014 | Pervan et al. |
| 8,640,424 B2 | 2/2014 | Pervan et al. |
| 8,650,826 B2 | 2/2014 | Pervan et al. |
| 8,677,714 B2 | 3/2014 | Pervan |
| 8,689,512 B2 | 4/2014 | Pervan |
| 8,707,650 B2 | 4/2014 | Pervan |
| 8,713,886 B2 | 5/2014 | Boo et al. |
| 8,733,065 B2 | 5/2014 | Pervan |
| 8,733,410 B2 | 5/2014 | Pervan |
| 8,763,341 B2 | 7/2014 | Pervan |
| 8,769,905 B2 | 7/2014 | Pervan |
| 8,776,473 B2 | 7/2014 | Pervan et al. |
| 8,844,236 B2 | 9/2014 | Pervan et al. |
| 8,857,126 B2 | 10/2014 | Pervan et al. |
| 8,869,485 B2 | 10/2014 | Pervan |
| 8,887,468 B2 | 11/2014 | Hakansson et al. |
| 8,898,988 B2 | 12/2014 | Pervan |
| 8,925,274 B2 | 1/2015 | Pervan et al. |
| 8,959,866 B2 | 2/2015 | Pervan |
| 8,973,331 B2 | 3/2015 | Boo |
| 8,991,055 B2 | 3/2015 | Cappelle |
| 9,027,306 B2 | 5/2015 | Pervan |
| 9,051,738 B2 | 6/2015 | Pervan et al. |
| 9,068,360 B2 | 6/2015 | Pervan |
| 9,091,077 B2 | 7/2015 | Boo |
| 9,194,134 B2 | 11/2015 | Nygren et al. |
| 9,212,492 B2 | 12/2015 | Pervan et al. |
| 9,216,541 B2 | 12/2015 | Boo et al. |
| 9,238,917 B2 | 1/2016 | Pervan et al. |
| 9,284,737 B2 | 3/2016 | Pervan et al. |
| 9,309,679 B2 | 4/2016 | Pervan et al. |
| 9,316,002 B2 | 4/2016 | Boo |
| 9,340,974 B2 | 5/2016 | Pervan et al. |
| 9,347,469 B2 | 5/2016 | Pervan |
| 9,359,774 B2 | 6/2016 | Pervan |
| 9,366,036 B2 | 6/2016 | Pervan |
| 9,371,654 B2 | 6/2016 | Capelle |
| 9,376,821 B2 | 6/2016 | Pervan et al. |
| 9,382,716 B2 | 7/2016 | Pervan et al. |
| 9,388,584 B2 | 7/2016 | Pervan et al. |
| 9,428,919 B2 | 8/2016 | Pervan et al. |
| 9,453,347 B2 | 9/2016 | Pervan et al. |
| 9,458,634 B2 | 10/2016 | Derelov |
| 9,482,012 B2 | 11/2016 | Nygren et al. |
| 9,540,826 B2 | 1/2017 | Pervan et al. |
| 9,663,940 B2 | 5/2017 | Boo |
| 9,725,912 B2 | 8/2017 | Pervan |
| 9,771,723 B2 | 9/2017 | Pervan |
| 9,777,487 B2 | 10/2017 | Pervan et al. |
| 9,803,374 B2 | 10/2017 | Pervan |
| 9,803,375 B2 | 10/2017 | Pervan |
| 9,856,656 B2 | 1/2018 | Pervan |
| 9,874,027 B2 | 1/2018 | Pervan |
| 9,945,130 B2 | 4/2018 | Nygren et al. |
| 9,951,526 B2 | 4/2018 | Boo et al. |
| 10,006,210 B2 | 6/2018 | Pervan et al. |
| 10,017,948 B2 | 7/2018 | Boo |
| 10,113,319 B2 | 10/2018 | Pervan |
| 10,125,488 B2 | 11/2018 | Boo |
| 10,138,636 B2 | 11/2018 | Pervan |
| 10,161,139 B2 | 12/2018 | Pervan |
| 10,180,005 B2 | 1/2019 | Pervan et al. |
| 10,214,915 B2 | 2/2019 | Pervan et al. |
| 10,214,917 B2 | 2/2019 | Pervan et al. |
| 10,240,348 B2 | 3/2019 | Pervan et al. |
| 10,240,349 B2 | 3/2019 | Pervan et al. |
| 10,246,883 B2 | 4/2019 | Derelöv |
| 10,352,049 B2 | 7/2019 | Boo |
| 10,358,830 B2 | 7/2019 | Pervan |
| 10,458,125 B2 | 10/2019 | Pervan |
| 2001/0024707 A1 | 9/2001 | Andersson et al. |
| 2001/0034991 A1 | 11/2001 | Martensson |
| 2001/0045150 A1 | 11/2001 | Owens |
| 2002/0014047 A1 | 2/2002 | Thiers |
| 2002/0031646 A1 | 3/2002 | Chen et al. |
| 2002/0069611 A1 | 6/2002 | Leopolder |
| 2002/0092263 A1 | 7/2002 | Schulte |
| 2002/0095894 A1 | 7/2002 | Pervan |
| 2002/0108343 A1 | 8/2002 | Knauseder |
| 2002/0170258 A1 | 11/2002 | Schwitte et al. |
| 2002/0170259 A1 | 11/2002 | Ferris |
| 2002/0178674 A1 | 12/2002 | Pervan |
| 2002/0178680 A1 | 12/2002 | Martensson |
| 2002/0189190 A1 | 12/2002 | Charmat et al. |
| 2002/0194807 A1 | 12/2002 | Nelson et al. |
| 2003/0009971 A1 | 1/2003 | Palmberg |
| 2003/0024199 A1 | 2/2003 | Pervan et al. |
| 2003/0037504 A1 | 2/2003 | Schwitte et al. |
| 2003/0066588 A1 | 4/2003 | Pålsson |
| 2003/0084636 A1 | 5/2003 | Pervan |
| 2003/0094230 A1 | 5/2003 | Sjoberg |
| 2003/0101674 A1 | 6/2003 | Pervan |
| 2003/0101681 A1 | 6/2003 | Tychsen |
| 2003/0145549 A1 | 8/2003 | Palsson et al. |
| 2003/0180091 A1 | 9/2003 | Stridsman |
| 2003/0188504 A1 | 10/2003 | Ralf |
| 2003/0196405 A1 | 10/2003 | Pervan |
| 2004/0016196 A1 | 1/2004 | Pervan |
| 2004/0031225 A1 | 2/2004 | Fowler |
| 2004/0031227 A1 | 2/2004 | Knauseder |
| 2004/0049999 A1 | 3/2004 | Krieger |
| 2004/0060255 A1 | 4/2004 | Knauseder |
| 2004/0068954 A1 | 4/2004 | Martensson |
| 2004/0123548 A1 | 7/2004 | Gimpel et al. |
| 2004/0128934 A1 | 7/2004 | Hecht |
| 2004/0139676 A1 | 7/2004 | Knauseder |
| 2004/0139678 A1 | 7/2004 | Pervan |
| 2004/0159066 A1 | 8/2004 | Thiers et al. |
| 2004/0168392 A1 | 9/2004 | Konzelmann et al. |
| 2004/0177584 A1 | 9/2004 | Pervan |
| 2004/0182033 A1 | 9/2004 | Wernersson |
| 2004/0182036 A1 | 9/2004 | Sjoberg et al. |
| 2004/0200175 A1 | 10/2004 | Weber |
| 2004/0211143 A1 | 10/2004 | Hanning |
| 2004/0238001 A1* | 12/2004 | Risden .......... A46B 17/06 134/6 |
| 2004/0244325 A1 | 12/2004 | Nelson |
| 2004/0250492 A1 | 12/2004 | Becker |
| 2004/0261348 A1 | 12/2004 | Vulin |
| 2005/0003132 A1 | 1/2005 | Blix et al. |
| 2005/0028474 A1 | 2/2005 | Kim |
| 2005/0050827 A1 | 3/2005 | Schitter |
| 2005/0160694 A1 | 7/2005 | Pervan |
| 2005/0166514 A1 | 8/2005 | Pervan |
| 2005/0205161 A1 | 9/2005 | Lewark |
| 2005/0210810 A1 | 9/2005 | Pervan |
| 2005/0235593 A1 | 10/2005 | Hecht |
| 2005/0252130 A1 | 11/2005 | Martensson |
| 2005/0252167 A1 | 11/2005 | Van Horne, Jr. |
| 2005/0268570 A2 | 12/2005 | Pervan |
| 2006/0053724 A1 | 3/2006 | Braun et al. |
| 2006/0070333 A1 | 4/2006 | Pervan |
| 2006/0101769 A1* | 5/2006 | Pervan .......... E04F 15/02 52/591.1 |
| 2006/0156670 A1 | 7/2006 | Knauseder |
| 2006/0174577 A1 | 8/2006 | O'Neil |
| 2006/0179754 A1 | 8/2006 | Yang |
| 2006/0236642 A1 | 10/2006 | Pervan |
| 2006/0260254 A1 | 11/2006 | Pervan et al. |
| 2006/0272262 A1 | 12/2006 | Pomberger |
| 2007/0006543 A1 | 1/2007 | Engström |
| 2007/0011981 A1 | 1/2007 | Eiserman |
| 2007/0028547 A1 | 2/2007 | Grafenauer |
| 2007/0065293 A1 | 3/2007 | Hannig |
| 2007/0108679 A1 | 5/2007 | Grothaus |
| 2007/0151189 A1 | 7/2007 | Yang et al. |
| 2007/0175156 A1 | 8/2007 | Pervan et al. |
| 2007/0193178 A1 | 8/2007 | Groeke et al. |
| 2007/0209736 A1 | 9/2007 | Deringor et al. |
| 2007/0214741 A1 | 9/2007 | Llorens Miravet |
| 2008/0000182 A1 | 1/2008 | Pervan |
| 2008/0000185 A1 | 1/2008 | Duernberger |
| 2008/0000186 A1 | 1/2008 | Pervan et al. |

(56) References Cited

U.S. PATENT DOCUMENTS

| | | |
|---|---|---|
| 2008/0000187 A1 | 1/2008 | Pervan et al. |
| 2008/0005998 A1 | 1/2008 | Pervan |
| 2008/0010931 A1 | 1/2008 | Pervan et al. |
| 2008/0010937 A1 | 1/2008 | Pervan et al. |
| 2008/0017274 A1 | 1/2008 | Burkholder |
| 2008/0028707 A1 | 2/2008 | Pervan |
| 2008/0034708 A1 | 2/2008 | Pervan |
| 2008/0041008 A1 | 2/2008 | Pervan |
| 2008/0053029 A1 | 3/2008 | Ricker |
| 2008/0066415 A1 | 3/2008 | Pervan |
| 2008/0104921 A1 | 5/2008 | Pervan et al. |
| 2008/0110125 A1 | 5/2008 | Pervan |
| 2008/0134607 A1 | 6/2008 | Prevan |
| 2008/0134613 A1 | 6/2008 | Pervan |
| 2008/0134614 A1 | 6/2008 | Pervan |
| 2008/0155930 A1 | 7/2008 | Pervan et al. |
| 2008/0184646 A1 | 8/2008 | Alford |
| 2008/0209838 A1 | 9/2008 | Pervan |
| 2008/0216434 A1 | 9/2008 | Pervan |
| 2008/0216920 A1 | 9/2008 | Pervan |
| 2008/0236088 A1 | 10/2008 | Hannig et al. |
| 2008/0295432 A1 | 12/2008 | Pervan et al. |
| 2008/0302044 A1 | 12/2008 | Johansson |
| 2009/0019806 A1 | 1/2009 | Muehlebach |
| 2009/0133353 A1 | 5/2009 | Pervan et al. |
| 2009/0193741 A1 | 8/2009 | Cappelle |
| 2009/0193748 A1 | 8/2009 | Boo et al. |
| 2009/0193753 A1 | 8/2009 | Schitter |
| 2009/0217615 A1 | 9/2009 | Engstrom |
| 2010/0170189 A1 | 7/2010 | Schulte |
| 2010/0293879 A1 | 11/2010 | Pervan et al. |
| 2010/0300031 A1 | 12/2010 | Pervan et al. |
| 2010/0319290 A1 | 12/2010 | Pervan |
| 2010/0319291 A1* | 12/2010 | Pervan .................. E04F 15/02 52/588.1 |
| 2011/0030303 A1 | 2/2011 | Pervan et al. |
| 2011/0041996 A1 | 2/2011 | Pervan |
| 2011/0088344 A1 | 4/2011 | Pervan et al. |
| 2011/0088345 A1 | 4/2011 | Pervan |
| 2011/0088346 A1 | 4/2011 | Hannig |
| 2011/0154763 A1 | 6/2011 | Bergelin et al. |
| 2011/0167750 A1 | 7/2011 | Pervan |
| 2011/0167751 A1 | 7/2011 | Engström |
| 2011/0225921 A1 | 9/2011 | Schulte |
| 2011/0225922 A1 | 9/2011 | Pervan et al. |
| 2011/0252733 A1 | 10/2011 | Pervan |
| 2011/0283650 A1 | 11/2011 | Pervan et al. |
| 2012/0017533 A1 | 1/2012 | Pervan et al. |
| 2012/0031029 A1 | 2/2012 | Pervan et al. |
| 2012/0036804 A1 | 2/2012 | Pervan |
| 2012/0151865 A1 | 6/2012 | Pervan et al. |
| 2012/0174515 A1 | 7/2012 | Pervan |
| 2012/0174520 A1 | 7/2012 | Pervan |
| 2012/0279161 A1 | 11/2012 | Håkansson et al. |
| 2013/0008117 A1 | 1/2013 | Pervan |
| 2013/0014463 A1 | 1/2013 | Pervan |
| 2013/0019555 A1 | 1/2013 | Pervan |
| 2013/0042562 A1 | 2/2013 | Pervan |
| 2013/0042563 A1 | 2/2013 | Pervan |
| 2013/0042564 A1 | 2/2013 | Pervan et al. |
| 2013/0042565 A1 | 2/2013 | Pervan |
| 2013/0047536 A1 | 2/2013 | Pervan |
| 2013/0081349 A1 | 4/2013 | Pervan et al. |
| 2013/0111845 A1 | 5/2013 | Pervan |
| 2013/0145708 A1 | 6/2013 | Pervan |
| 2013/0160391 A1 | 6/2013 | Pervan et al. |
| 2013/0232905 A2 | 9/2013 | Pervan |
| 2013/0239508 A1 | 9/2013 | Pervan et al. |
| 2013/0263454 A1 | 10/2013 | Boo et al. |
| 2013/0263547 A1 | 10/2013 | Boo |
| 2013/0318906 A1 | 12/2013 | Pervan et al. |
| 2014/0007539 A1 | 1/2014 | Pervan et al. |
| 2014/0020324 A1 | 1/2014 | Pervan |
| 2014/0033634 A1 | 2/2014 | Pervan |
| 2014/0053497 A1 | 2/2014 | Pervan et al. |
| 2014/0059966 A1 | 3/2014 | Boo |
| 2014/0069043 A1 | 3/2014 | Pervan |
| 2014/0090335 A1 | 4/2014 | Pervan et al. |
| 2014/0109501 A1 | 4/2014 | Pervan |
| 2014/0109506 A1 | 4/2014 | Pervan et al. |
| 2014/0123586 A1 | 5/2014 | Pervan et al. |
| 2014/0150369 A1 | 6/2014 | Hannig |
| 2014/0190112 A1 | 7/2014 | Pervan |
| 2014/0208677 A1 | 7/2014 | Pervan et al. |
| 2014/0223852 A1 | 8/2014 | Pervan |
| 2014/0237931 A1 | 8/2014 | Pervan |
| 2014/0250813 A1 | 9/2014 | Nygren et al. |
| 2014/0260060 A1 | 9/2014 | Pervan et al. |
| 2014/0283466 A1 | 9/2014 | Boo |
| 2014/0305065 A1 | 10/2014 | Pervan |
| 2014/0366476 A1 | 12/2014 | Pervan |
| 2014/0373478 A2 | 12/2014 | Pervan et al. |
| 2014/0373480 A1 | 12/2014 | Pervan et al. |
| 2015/0000221 A1 | 1/2015 | Boo |
| 2015/0059281 A1 | 3/2015 | Pervan |
| 2015/0089896 A2 | 4/2015 | Pervan et al. |
| 2015/0121796 A1 | 5/2015 | Pervan |
| 2015/0152644 A1 | 6/2015 | Boo |
| 2015/0167318 A1 | 6/2015 | Pervan |
| 2015/0211239 A1 | 7/2015 | Pervan |
| 2015/0233125 A1 | 8/2015 | Pervan et al. |
| 2015/0267419 A1 | 9/2015 | Pervan |
| 2015/0300029 A1 | 10/2015 | Pervan |
| 2015/0330088 A1 | 11/2015 | Derelov |
| 2015/0337537 A1 | 11/2015 | Boo |
| 2016/0032596 A1 | 2/2016 | Nygren et al. |
| 2016/0060879 A1 | 3/2016 | Pervan |
| 2016/0069088 A1 | 3/2016 | Boo et al. |
| 2016/0076260 A1 | 3/2016 | Pervan et al. |
| 2016/0090744 A1 | 3/2016 | Pervan et al. |
| 2016/0168866 A1 | 6/2016 | Pervan et al. |
| 2016/0186426 A1 | 6/2016 | Boo |
| 2016/0194884 A1 | 7/2016 | Pervan et al. |
| 2016/0201336 A1 | 7/2016 | Pervan |
| 2016/0251859 A1 | 9/2016 | Pervan et al. |
| 2016/0251860 A1 | 9/2016 | Pervan |
| 2016/0281368 A1 | 9/2016 | Pervan et al. |
| 2016/0281370 A1 | 9/2016 | Pervan et al. |
| 2016/0326751 A1 | 11/2016 | Pervan |
| 2016/0340913 A1 | 11/2016 | Derelöv |
| 2017/0037641 A1 | 2/2017 | Nygren et al. |
| 2017/0081860 A1 | 3/2017 | Boo |
| 2017/0254096 A1 | 9/2017 | Pervan |
| 2017/0321433 A1 | 11/2017 | Pervan et al. |
| 2017/0362834 A1 | 12/2017 | Pervan et al. |
| 2018/0001509 A1 | 1/2018 | Myllykangas et al. |
| 2018/0001510 A1 | 1/2018 | Fransson |
| 2018/0001573 A1 | 1/2018 | Blomgren et al. |
| 2018/0002933 A1 | 1/2018 | Pervan |
| 2018/0016783 A1 | 1/2018 | Boo |
| 2018/0030737 A1 | 2/2018 | Pervan |
| 2018/0030738 A1 | 2/2018 | Pervan |
| 2018/0119431 A1 | 5/2018 | Pervan et al. |
| 2018/0178406 A1 | 6/2018 | Fransson et al. |
| 2018/0362138 A1* | 12/2018 | Gross ....................... B64C 1/18 |
| 2019/0024387 A1 | 1/2019 | Pervan et al. |
| 2019/0048592 A1 | 2/2019 | Boo |
| 2019/0048596 A1 | 2/2019 | Pervan |
| 2019/0063076 A1 | 2/2019 | Boo et al. |
| 2019/0093370 A1 | 3/2019 | Pervan et al. |
| 2019/0093371 A1 | 3/2019 | Pervan |
| 2019/0119928 A1 | 4/2019 | Pervan et al. |
| 2019/0127989 A1 | 5/2019 | Kell |
| 2019/0127990 A1 | 5/2019 | Pervan et al. |
| 2019/0169859 A1 | 6/2019 | Pervan et al. |
| 2019/0232473 A1 | 8/2019 | Fransson et al. |
| 2019/0271165 A1 | 9/2019 | Boo |

FOREIGN PATENT DOCUMENTS

| | | |
|---|---|---|
| DE | 138 992 C | 7/1901 |
| DE | 142 293 C | 7/1902 |
| DE | 2 159 042 | 6/1973 |
| DE | 25 05 489 A1 | 8/1976 |

(56) References Cited

FOREIGN PATENT DOCUMENTS

| | | |
|---|---|---|
| DE | 33 43 601 A1 | 6/1985 |
| DE | 33 43 601 C2 | 6/1985 |
| DE | 39 32 980 A1 | 11/1991 |
| DE | 42 15 273 A1 | 11/1993 |
| DE | 42 42 530 A1 | 6/1994 |
| DE | 196 01 322 A | 5/1997 |
| DE | 299 22 649 U1 | 4/2000 |
| DE | 200 01 788 U1 | 6/2000 |
| DE | 200 02 744 U1 | 8/2000 |
| DE | 199 40 837 A1 | 11/2000 |
| DE | 199 58 225 A1 | 6/2001 |
| DE | 202 05 774 U1 | 8/2002 |
| DE | 203 20 799 U1 | 4/2005 |
| DE | 10 2004 055 951 A1 | 7/2005 |
| DE | 10 2004 001 363 A1 | 8/2005 |
| DE | 10 2005 002 297 A1 | 8/2005 |
| DE | 10 2004 054 368 A1 | 5/2006 |
| DE | 10 2005 024 366 A1 | 11/2006 |
| EP | 0 013 852 A1 | 8/1980 |
| EP | 0 871 156 A2 | 10/1998 |
| EP | 0 974 713 A1 | 1/2000 |
| EP | 1 120 515 A1 | 8/2001 |
| EP | 1 146 182 A2 | 10/2001 |
| EP | 1 251 219 A | 10/2002 |
| EP | 1 350 904 A2 | 10/2003 |
| EP | 1 350 904 A3 | 10/2003 |
| EP | 1 396 593 A2 | 3/2004 |
| EP | 1 420 125 A2 | 5/2004 |
| EP | 1 437 457 A2 | 7/2004 |
| EP | 1 640 530 A2 | 3/2006 |
| EP | 1 650 375 A1 | 4/2006 |
| EP | 1 650 375 A8 | 9/2006 |
| EP | 2278091 A2 * | 1/2011 ............... E04F 21/22 |
| EP | 2388391 A2 * | 11/2011 ............... E04F 21/22 |
| EP | 2388394 A2 * | 11/2011 ............... E04F 21/22 |
| EP | 2388409 A2 * | 11/2011 ............... E04F 21/22 |
| FR | 1.138.595 | 6/1957 |
| FR | 2 256 807 | 8/1975 |
| FR | 2 810 060 A1 | 12/2001 |
| GB | 240629 | 10/1925 |
| GB | 376352 | 7/1932 |
| GB | 1171337 | 11/1969 |
| GB | 2 051 916 A | 1/1981 |
| JP | 03-110258 A | 5/1991 |
| JP | 05-018028 A | 1/1993 |
| JP | 6-146553 A | 5/1994 |
| JP | 6-288017 A | 10/1994 |
| JP | 6-306961 A | 11/1994 |
| JP | 6-322848 A | 11/1994 |
| JP | 7-300979 A | 11/1995 |
| JP | 2900115 B2 * | 6/1999 |
| JP | 2002047782 A * | 2/2002 |
| SE | 526 688 C2 | 5/2005 |
| SE | 529 076 C2 | 4/2007 |
| WO | WO 94/26999 A1 | 11/1994 |
| WO | WO 96/23942 A1 | 8/1996 |
| WO | WO 96/27721 A1 | 9/1996 |
| WO | WO 97/47834 A1 | 12/1997 |
| WO | WO 98/21428 A1 | 5/1998 |
| WO | WO 98/22677 A1 | 5/1998 |
| WO | WO 98/58142 A1 | 12/1998 |
| WO | WO 99/66151 A1 | 12/1999 |
| WO | WO 99/66152 A1 | 12/1999 |
| WO | WO 00/20705 A1 | 4/2000 |
| WO | WO 00/20706 A1 | 4/2000 |
| WO | WO 00/43281 A2 | 7/2000 |
| WO | WO 00/47841 A1 | 8/2000 |
| WO | WO 00/55067 A1 | 9/2000 |
| WO | WO 01/02669 A1 | 1/2001 |
| WO | WO 01/02670 A1 | 1/2001 |
| WO | WO 01/02671 A1 | 1/2001 |
| WO | WO 01/02672 A1 | 1/2001 |
| WO | WO 01/07729 A1 | 2/2001 |
| WO | WO 01/38657 A1 | 5/2001 |
| WO | WO 01/44669 A2 | 6/2001 |
| WO | WO 01/44669 A3 | 6/2001 |
| WO | WO 01/48331 A1 | 7/2001 |
| WO | WO 01/48332 A1 | 7/2001 |
| WO | WO 01/51732 A1 | 7/2001 |
| WO | WO 01/51733 A1 | 7/2001 |
| WO | WO 01/66877 A1 | 9/2001 |
| WO | WO 01/75247 A1 | 10/2001 |
| WO | WO 01/77461 A1 | 10/2001 |
| WO | WO 01/94721 A1 | 12/2001 |
| WO | WO 01/94721 A8 | 12/2001 |
| WO | WO 01/98604 A1 | 12/2001 |
| WO | WO 02/48127 | 6/2002 |
| WO | WO 02/055809 A1 | 7/2002 |
| WO | WO 02/055810 A1 | 7/2002 |
| WO | WO 02/081843 A1 | 10/2002 |
| WO | WO 02/103135 A1 | 12/2002 |
| WO | WO 03/012224 A1 | 2/2003 |
| WO | WO 03/016654 A1 | 2/2003 |
| WO | WO 03/025307 A1 | 3/2003 |
| WO | WO 03/038210 A1 | 5/2003 |
| WO | WO 03/044303 A1 | 5/2003 |
| WO | WO 03/069094 A1 | 8/2003 |
| WO | WO 03/074814 A1 | 9/2003 |
| WO | WO 03/083234 A1 | 10/2003 |
| WO | WO 03/087497 A1 | 10/2003 |
| WO | WO 03/089736 A1 | 10/2003 |
| WO | WO 2004/016877 A1 | 2/2004 |
| WO | WO 2004/020764 A1 | 3/2004 |
| WO | WO 2004/048716 A1 | 6/2004 |
| WO | WO 2004/050780 A2 | 6/2004 |
| WO | WO 2004/079128 A1 | 9/2004 |
| WO | WO 2004/079130 A1 | 9/2004 |
| WO | WO 2004/083557 A1 | 9/2004 |
| WO | WO 2004/085765 A1 | 10/2004 |
| WO | WO 2005/003488 A1 | 1/2005 |
| WO | WO 2005/003489 A1 | 1/2005 |
| WO | WO 2005/054599 A1 | 6/2005 |
| WO | WO 2006/043893 A1 | 4/2006 |
| WO | WO 2006043893 A1 * | 4/2006 ............... E04F 21/22 |
| WO | WO 2006/050928 A1 | 5/2006 |
| WO | WO 2006/104436 A1 | 10/2006 |
| WO | WO 2006/123988 A1 | 11/2006 |
| WO | WO 2006/125646 A1 | 11/2006 |
| WO | WO 2007/015669 A2 | 2/2007 |
| WO | WO 2007/019957 A1 | 2/2007 |
| WO | WO 2007/079845 A1 | 7/2007 |
| WO | WO 2007/089186 A1 | 8/2007 |
| WO | WO 2007/118352 A1 | 10/2007 |
| WO | WO 2007/141605 A2 | 12/2007 |
| WO | WO 2007/142589 A1 | 12/2007 |
| WO | WO 2008/004960 A2 | 1/2008 |
| WO | WO 2008/004960 A8 | 1/2008 |
| WO | WO 2008/017281 A1 | 2/2008 |
| WO | WO 2008/017301 A2 | 2/2008 |
| WO | WO 2008/017301 A3 | 2/2008 |
| WO | WO 2008/060232 A1 | 5/2008 |
| WO | WO 2009/013590 A2 | 1/2009 |
| WO | WO-2012059093 A2 * | 5/2012 ............... E02D 3/046 |

OTHER PUBLICATIONS

U.S. Appl. No. 15/148,820, Darko Pervan, filed May 6, 2016.
Pervan, Darko, U.S. Appl. No. 14/938,612, entitled "Mechanical Locking System for Floor Panels," filed in the U.S. Patent and Trademark Office on Nov. 11, 2015.
Pervan, Darko, U.S. Appl. No. 14/951,976, entitled "Mechanical Locking System for Floor Panels," filed in the U.S. Patent and Trademark Office on Nov. 25, 2015.
Pervan, Darko, et al., U.S. Appl. No. 14/962,291, entitled "Mechanical Locking System for Floor Panels," filed in the U.S. Patent and Trademark Office on Dec. 8, 2015.
U.S. Appl. No. 14/095,052, Darko Pervan and Christian Boo, filed Dec. 3, 2013 (Cited here in as US Patent Application Publication No. 2014/0090335 A1 of Apr. 3, 2014).
U.S. Appl. No. 14/200,909, Per Nygren and Marcus Bergelin, filed Mar. 7, 2014 (Cited herein as US Patent Application Publication No. 2014/0250813 A1 of Sep. 11, 2014).

(56) References Cited

OTHER PUBLICATIONS

U.S. Appl. No. 14/206,214, Darko Pervan and Christian Boo, filed Mar. 12, 2014 (Cited herein as US Patent Application Publication No. 2014/0208677 A1 of Jul. 31, 2014)
International Search Report dated May 20, 2008 in PCT/SE2007/000836, Swedish Patent Office, Stockholm, Sweden, 7 pages.
Välinge Innovation AB, Technical Disclosure entitled "Mechanical locking for floor panels with a flexible bristle tongue," IP.com number: IPCOM000145262D, Jan. 12, 2007, IP.com PriorArtDatabase, 57 pages.
Laminate Flooring Tips (http://flooring.lifetips.com/cat/61734/laminate-flooring-tips/index.html). Copyright 2000. 12 pages.
U.S. Appl. No. 13/670,039, Darko Pervan Niclas Håkansson and Per Nygren, filed Nov. 6, 2012 (Cited herein as US Patent Application Publication No. 2013/0081349 A1 of Apr. 4, 2013).
U.S. Appl. No. 13/544,281, Darko Persian, filed Jul. 9, 2012 (Cited herein as US Patent Application Publication No. 2013/0014463 A1 of Jan. 17, 2013 and as US Patent Application Publication No. 2013/0232905 A2 of Sep. 13, 2013).
U.S. Appl. No. 14/046,235, Darko Pervan, Niclas Håkansson and Per Nygren, filed Oct. 4, 2013 (Cited herein as US Patent Application Publication No. 2014/0053497 A1 of Feb. 27, 2014).
U.S. Appl. No. 14/138,330, Darko Pervan, Niclas Håkansson and Per Nygren, filed Dec. 23, 2013 (Cited herein as US Patent Application Publication No. 2014/0109506 A1 of Apr. 24, 2014).
U.S. Appl. No. 14/152,402, Darko Pervan and Tony Pervan, filed Jan. 10, 2014 (Cited herein as US Patent Application Publication No. 2014/0123586 A1of May 8, 2014 and as US Patent Applicaiton Publication 2015/0089896 A2 of Apr. 2, 2015).
U.S. Appl. No. 14/206,286, Darko Pervan and Marcus Bergelin, filed Mar. 12, 2014 (Cited herein as US Patent Application Publication No. 2014/0190112 A1 of Jul. 10, 2014).
U.S. Appl. No. 14/258,742, Darko Pervan, filed Apr. 22, 2014 (Cited herein as US Patent Application Publication No. 2014/0223852 A1 of Aug. 14, 2014).
U.S. Appl. No. 14/294,230, Darko Pervan and Agne Pålsson, filed Jun. 3, 2014 (Cited herein as US Patent Application Publication No. 2014/0260060 A1 of Sep. 18, 2014).
U.S. Appl. No. 14/294,623, Darko Pervan, filed Jun. 3, 2014 (Cited herein as US Patent Application Publication No. 2014/0305065 A1 of Oct. 16, 2014).
U.S. Appl. No. 14/315,879, Christian Boo, filed Jun. 26, 2014 (Cited herin as US Patent Application Publication No. 2015/0000221 A1 of Jan. 1, 2015).
U.S. Appl. No. 14/463,972, Darko Pervan and Agne Pålsson, filed Aug. 20, 2014 (Cited herein as US Patent Application Publication No. 2014/0366476 A1 of Dec. 18, 2014).
U.S. Appl. No. 14/538,223, Darko Pervan, filed Nov. 11, 2014 (Cited herein as US Patent Application Publication No. 2015/0059281 A1 of Mar. 5, 2015).
U.S. Appl. No. 14/597,578, Darko Pervan, filed Jan. 15, 2015 (Cited herein as US Patent Application Publication No. 2015/0121796 A1 of May 7, 2015).
U.S. Appl. No. 14/633,480, Darko Pervan, filed Feb. 27, 2015 (Cited herein as US Patent Application Publication No. 2015/0167318 A1 of Jun. 18, 2015).
U.S. Appl. No. 14/683,340, Darko Pervan, filed Apr. 10, 2015.
U.S. Appl. No. 14/701,959, Darko Pervan and Tony Pervan, filed May 1, 2015.
U.S. Appl. No. 14/709,913, Peter Derelov, filed May 12, 2015.
U.S. Appl. No. 14/646,567, Darko Pervan, filed May 21, 2015.
U.S. Appl. No. 14/730,691, Darko Pervan, filed Jun. 4, 2015.
Pervan; Darko, U.S. Appl. No. 14/683,340 entitled "Mechanical Locking System for Floor Panels," filed in the U.S. Patent and Trademark Office on Apr. 10, 2015.
Pervan, Darko, et al., U.S. Appl. No. 14/701,959 entitled "Mechanical Locking system for Floor Panels," filed in the U.S. Patent and Trademark Office on May 1, 2015.
Pervan, Darko, U.S. Appl. No. 14/646,567 entitled "Mechanical Locking System for Floor Panels," filed in the U.S. Patent and Trademark Office on May 21, 2015.
Pervan, Darko, U.S. Appl. No. 14/730,691 entitled "Mechanical Locking System for Panels and Method for Installing Same," filed in the U.S. Patent and Trademark Office on Jun. 4, 2015.
Derelov, Peter. U.S. Appl. No. 14/709,913 entitled "Building Panel with a Mechanical Locking System," filed in the U.S. Patent and Trademark Office on May 12, 2015.
Perven, Darko, et al., U.S. Appl. No. 15/048,252, entitled "Mechanical Locking System for Floor Panels," filed in the U.S. Patent and Trademark Office Feb. 19, 2016.
Pervan Darko, U.S. Appl. No. 15/148,820, entitled "Mechanical Locking System for Panels and Method for Installing Same," filed in the U.S. Patent and Trademark Office May 6, 2016.
U.S. Appl. No. 15/160,311, Darko Pervan, filed May 20, 2016.
U.S. Appl. No. 15/172,926, Darko Pervan and Agne Pålsson, filed Jun. 3, 2016.
U.S. Appl. No. 15/175,768, Darko Pervan, filed Jun. 7, 2016.
U.S. Appl. No. 15/217,023, Darko Pervan and Agne Pålsson, filed Jul. 22, 2016.
U.S. Appl. No. 15/229,575, Peter Derelov, filed Aug. 5, 2016.
Pervan, Darko, U.S. Appl. No. 15/160,311, entitled "Mechanical Locking System for Floor Panels," filed in the U.S. Patent and Trademark Office May 20, 2016.
Pervan, Darko, et al., U.S. Appl. No. 15/172,926, entitled "Mechanical Locking of Floor Panels with a Flexible Bristle Tongue," filed in the U.S. Patent and Trademark Office on Jun. 3, 2016.
Pervan, Darko, et al., U.S. Appl. No. 15/175,768, entitled "Mechanical echanical Locking System for Floor Panels," filed in the U.S. Patent and Trademark Office on Jun. 7, 2016.
Pervan, Darko, et al., U.S. Appl. No. 15/217,023, entitled "Mechanical echanical Locking System for Floor Panels," filed in the U.S. Patent and Trademark Office on Jul. 22, 2016.
Derelöv, Peter, U.S. Appl. No. 15/229,575, entitled "Building Panel with a Mechanical Locking System," filed in the U.S. Patent and Trademark Office on Aug. 5, 2016.
U.S. Appl. No. 15/365,546, Christian Boo, filed Nov. 30, 2016.
Boo Christian, U.S. Appl. No. 15/365,546, entitled "Building Panel With a Mechanical Locking System," filed in the U.S. Patent and Trademark office on Nov. 30, 2016.
U.S. Appl. No. 15/261,071, Darko Pervan, filed Sep. 9, 2016.
Pervan; Darko, U.S. Appl. No. 15/261,071, entitled "Mechanical Locking System for Floor Panels," filed in the U.S. Patent and Trademark Office on Sep. 9, 2016.
U.S. Appl. No. 15/603,913, Darko Pervan, filed May 24, 2017.
Extended European Search Report issued in EP 07808839.0, dated Dec. 8, 2010, European Patent Office, Munich, Germany, 10 pages.
Extended European Search Report issued in EP 12190659.8, dated Jun. 23, 2016, European Patent Office, Munich, Germany, 8 pages.
Extended European Search Report issued in EP 13157194.5, dated Jul. 20, 2016, European Patent Office, Munich, Germany, 8 pages.
Extended European Search Report issued in EP 13195978.5, dated Jul. 29, 2016, European Patent Office, Munich, Germany, 6 pages.
Pervan, Darko, U.S. Appl. No. 15/603,913, entitled "Mechanical Locking System for Floor Panels," filed in the U.S. Patent and Trademark Office on May 24, 2017.
U.S. Appl. No. 15/855,389, Darko Pervan and Tony Pervan, filed Dec. 27, 2017.
U.S. Appl. No. 15/896,571, Darko Pervan, Niclas Håkansson and Per Nygren, filed Feb. 14, 2018.
Pervan, Darko, et al., U.S. Appl. No. 15/855,389 entitled "Mechanical Locking System for Floor Panels," filed in the U.S. Patent and Trademark Office on Dec. 27, 2017.
Pervan, Darko, et al., U.S. Appl. No. 15/896,571 entitled "Mechanical Locking of Floor Panels with a Flexible Tongue," filed in the U.S. Patent and Trademark Office on Feb. 14, 2018.
U.S. Appl. No. 15/726,853, Darko Pervan, filed Oct. 6, 2017.
U.S. Appl. No. 15/813,855, Darko Pervan, filed Nov. 15, 2017.
Pervan, Darko, U.S. Appl. No. 15/726,853 entitled "Mechanical Locking System for Panels and Method of Installing Same," filed in the U.S. Patent and Trademark Office Oct. 6, 2017.

(56) References Cited

OTHER PUBLICATIONS

Pervan, Darko, U.S. Appl. No. 15/813,855 entitled "Mechanical Locking of Floor Panels with a Glued Tongue," filed in the U.S. Patent and Trademark Office Nov. 15, 2017.
U.S. Appl. No. 16/143,610, Darko Pervan, filed Sep. 27, 2018.
U.S. Appl. No. 16/163,088, Darko Pervan, filed Oct. 17, 2018.
Pervan, Darko, U.S. Appl. No. 16/143,610 entitled "Mechanical Locking System for Panels and Method of Installing Same," filed in the U.S. Patent and Trademark Office on Sep. 27, 2018.
Pervan, Darko, U.S. Appl. No. 16/163,088 entitled "Mechanical Locking System for Floor Panels," filed in the U.S. Patent and Trademark Office on Oct. 17, 2018.
U.S. Appl. No. 16/269,806, Darko Pervan and Tony Pervan, filed Feb. 7, 2019.
Pervan, Darko, et al., U.S. Appl. No. 16/269,806 entitled "Mechanical Locking System for Floor Panels," filed in the U.S. Patent and Trademark Office on Feb. 7, 2019.
U.S. Appl. No. 16/419,660, Christian Boo, filed May 22, 2019.
U.S. Appl. No. 16/439,827, Darko Pervan, filed Jun. 13, 2019.
Boo, Christian, U.S. Appl. No. 16/419,660 entitled "Building Panel With a Mechanical Locking System," filed in the U.S. Patent and Trademark Office on May 22, 2019.
Pervan, Darko, U.S. Appl. No. 16/439,827 entitled "Mechanical Locking of Floor Panels With Vertical Folding," filed in the U.S. Patent and Trademark Office on Jun. 13, 2019.
Pervan, Darko, U.S. Appl. No. 16/581,990 entitled "Mechanical Locking System for Floor Panels," filed in the U.S. Patent and Trademark Office on Sep. 25, 2019.

\* cited by examiner

Prior Art

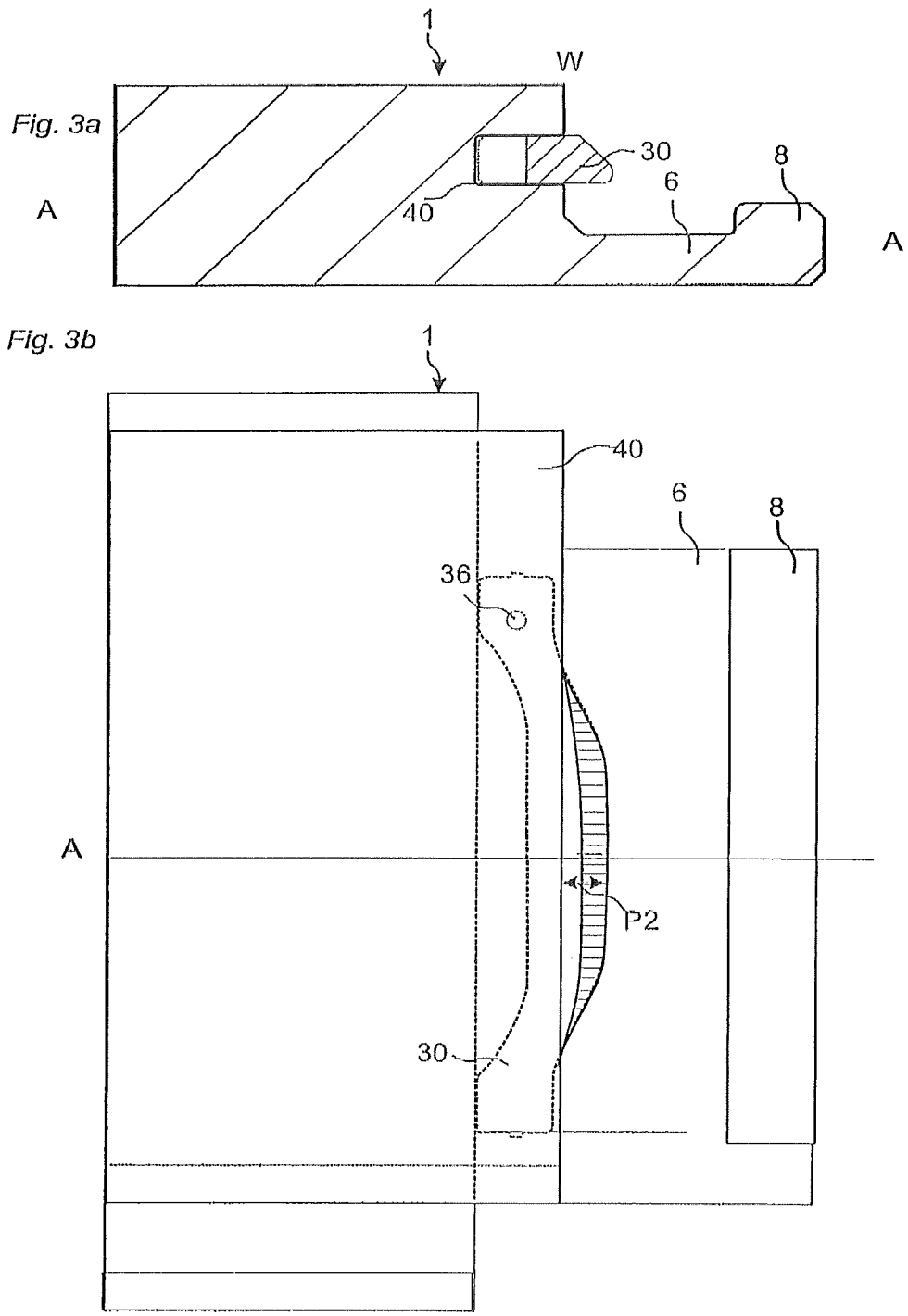
Prior Art

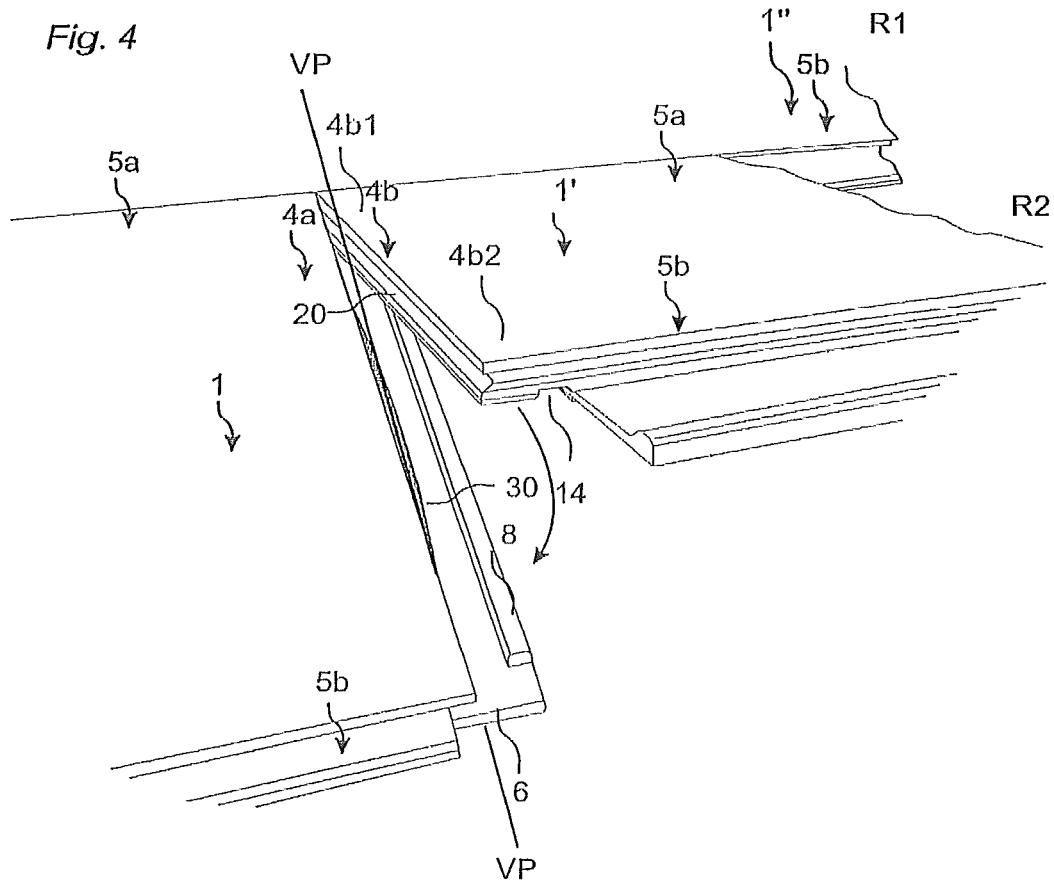
Prior Art

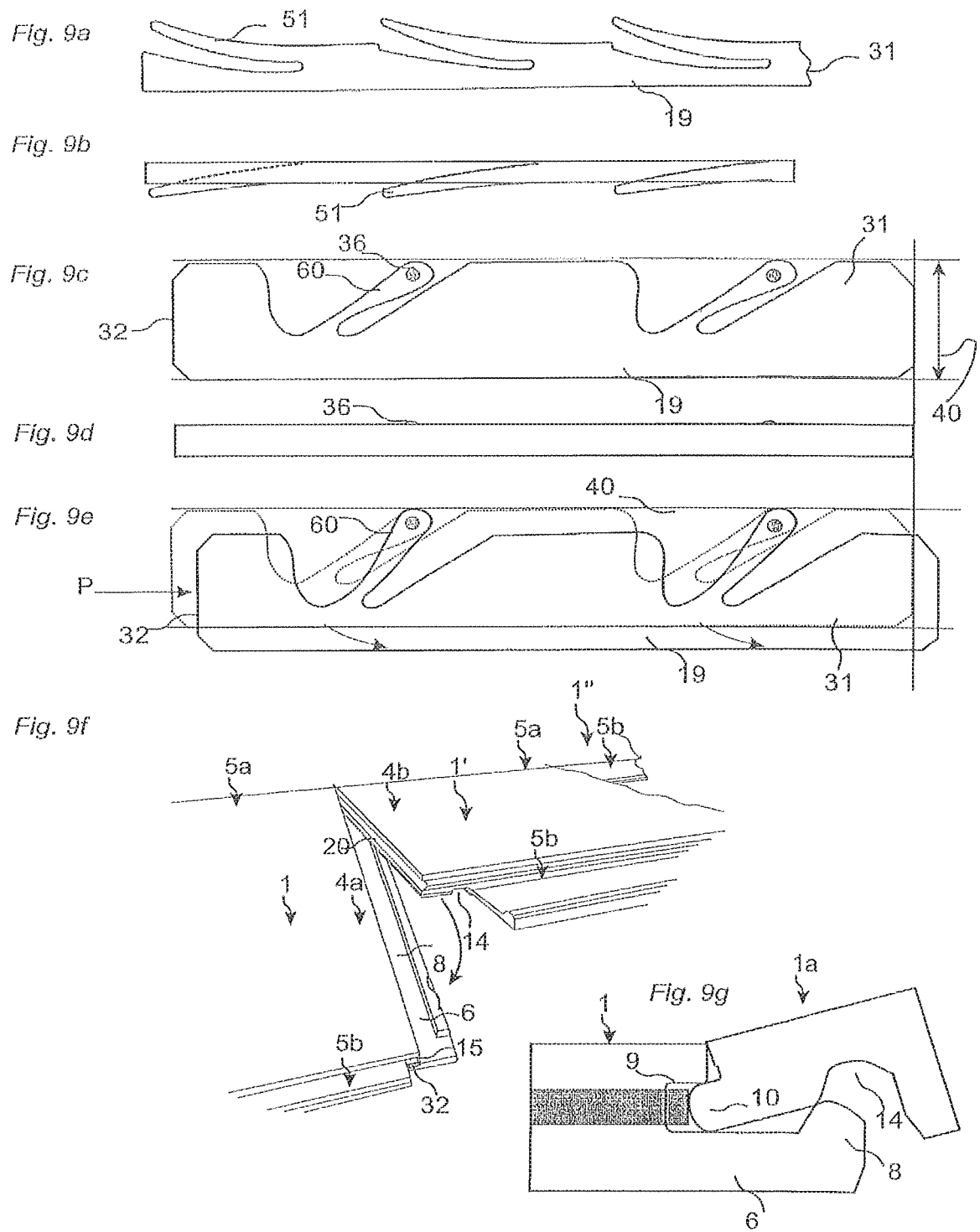

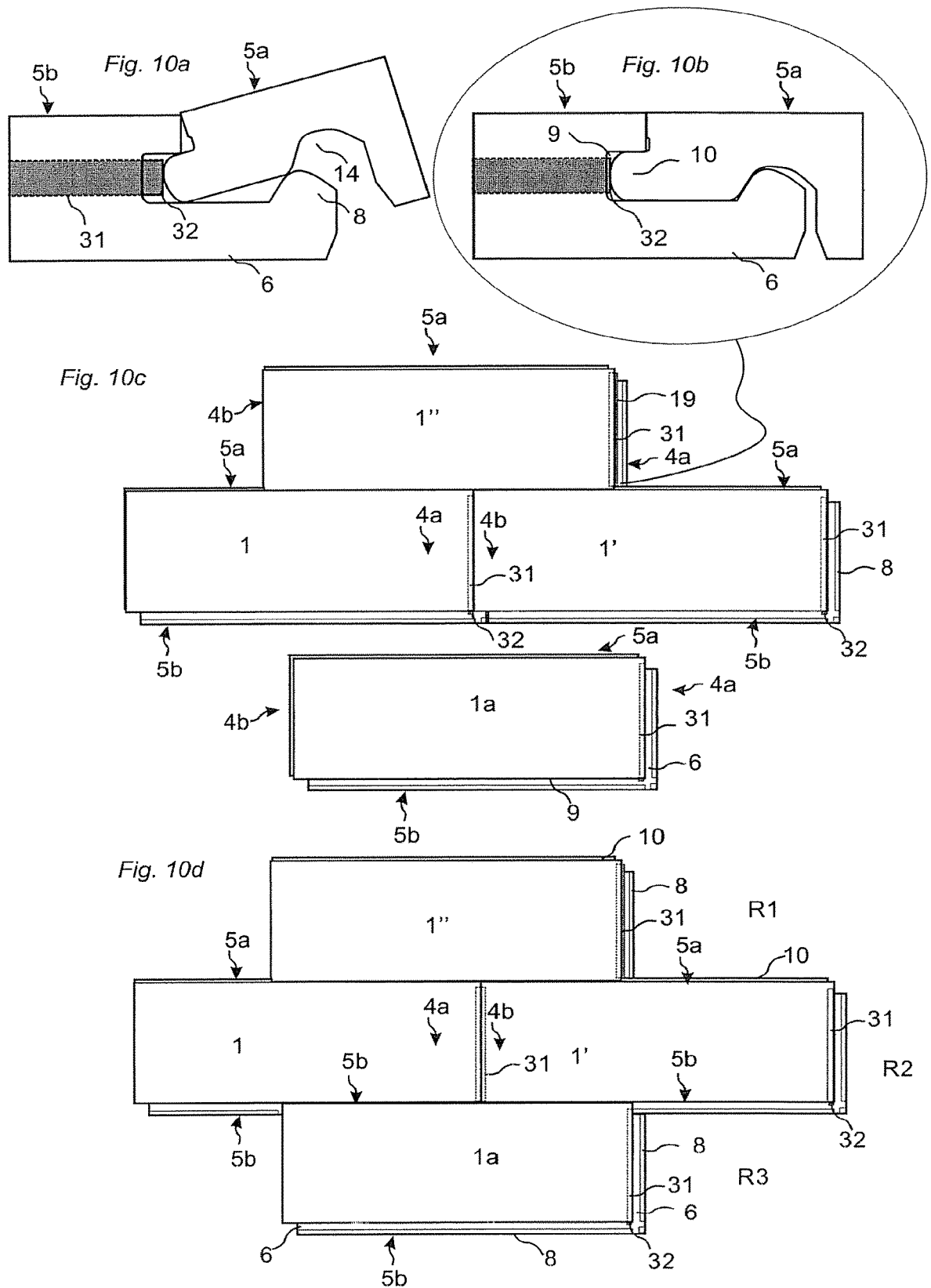

*Fig. 14a*
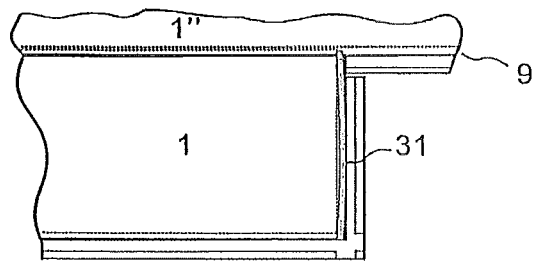
*Fig. 14b*
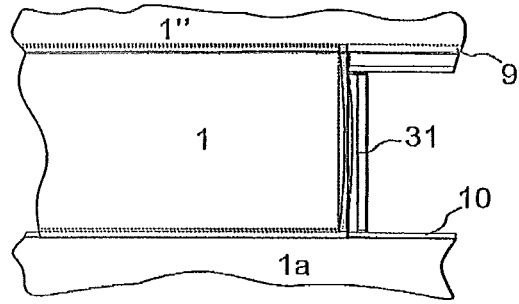
*Fig. 14c*
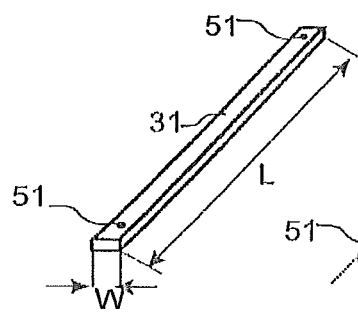
*Fig. 14d*
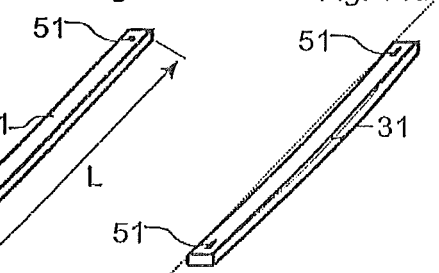
*Fig. 14e*
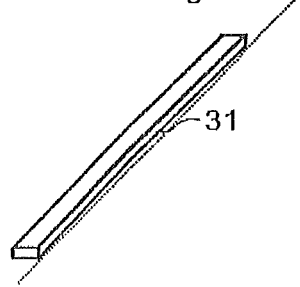
*Fig. 14f*
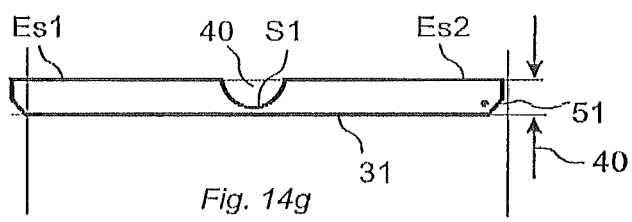
*Fig. 14g*
*Fig. 14h*
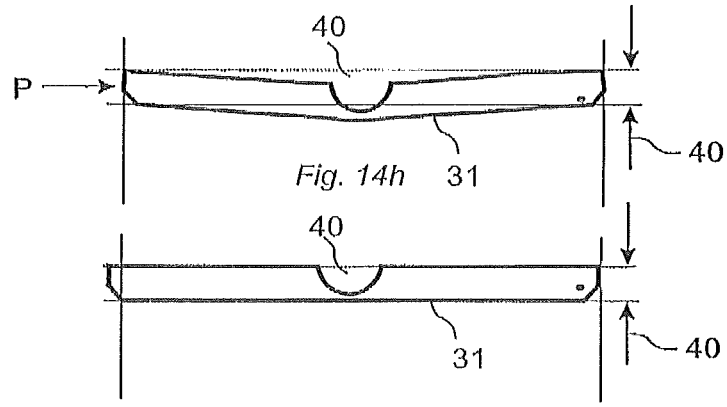

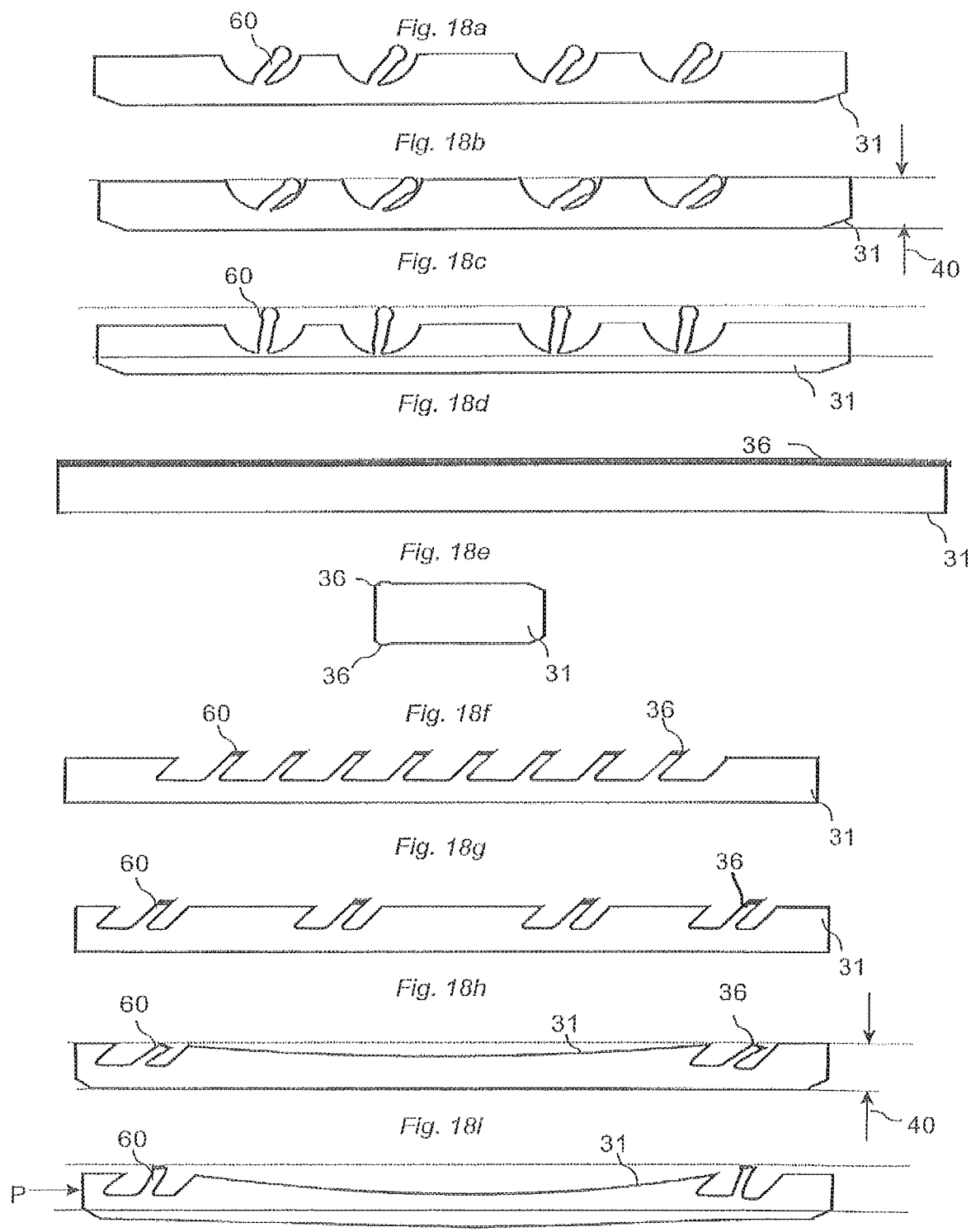

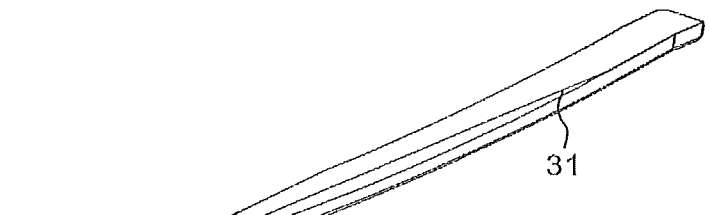
Fig. 21a
Fig. 21b
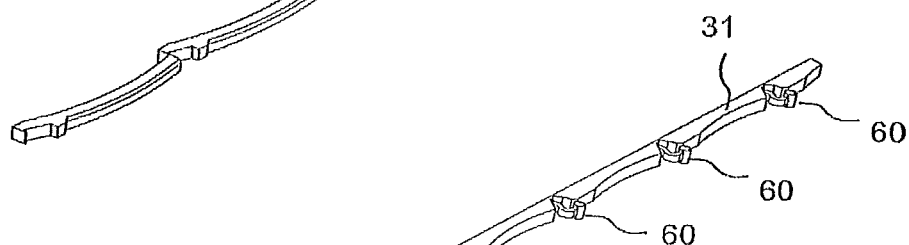
Fig. 21c
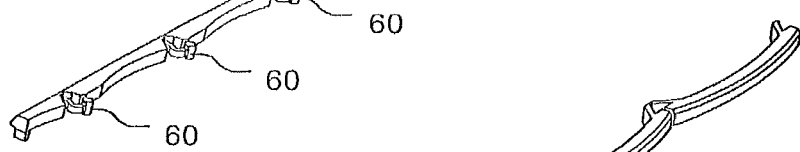
Fig. 21d
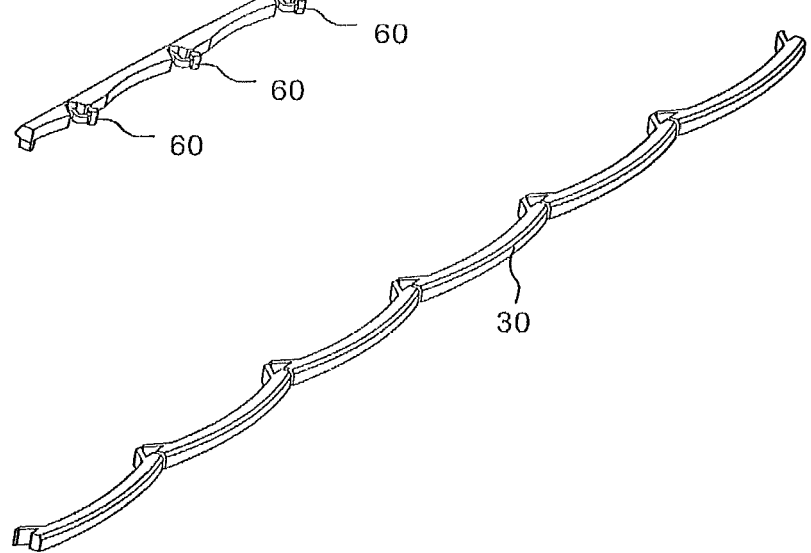

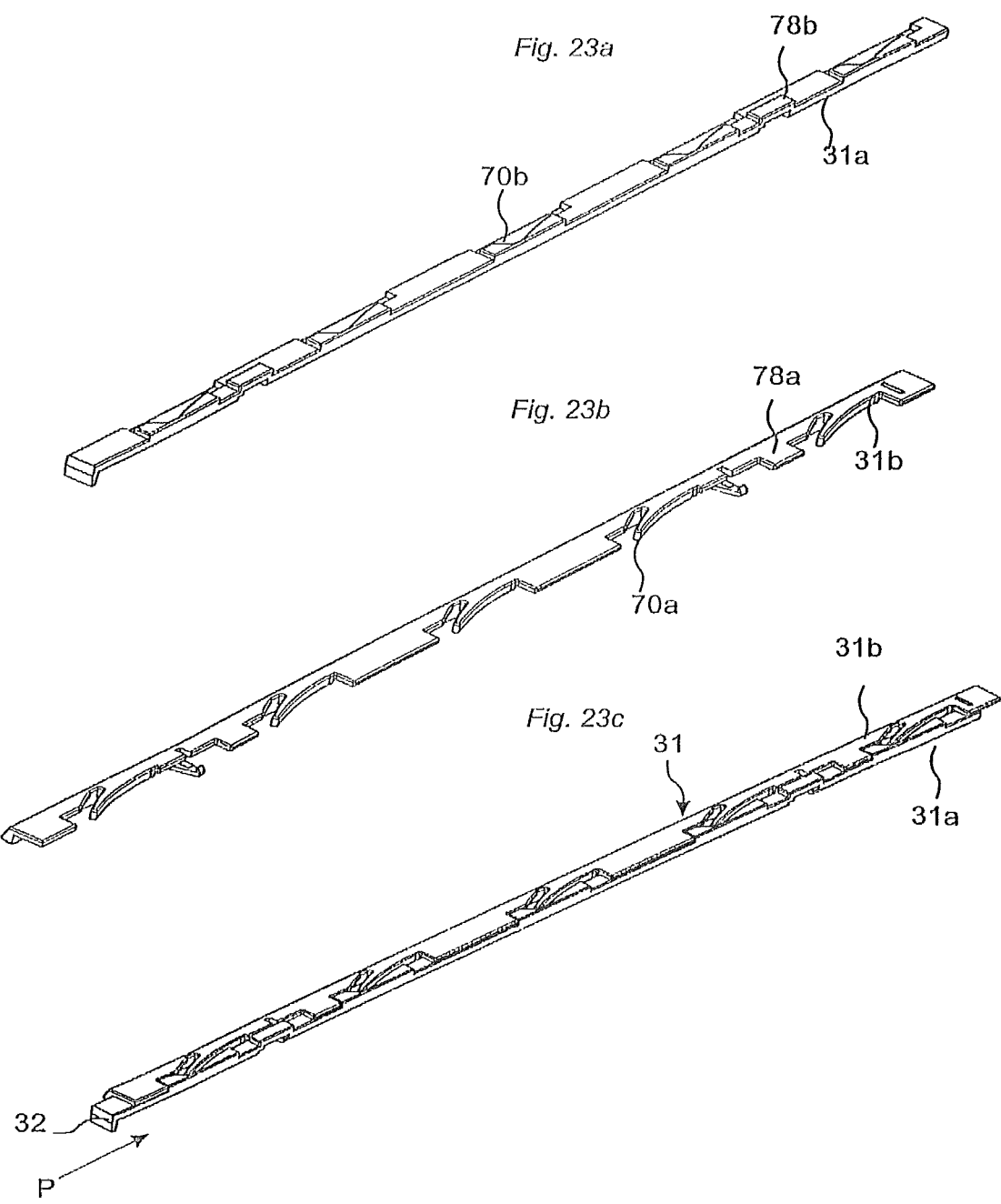

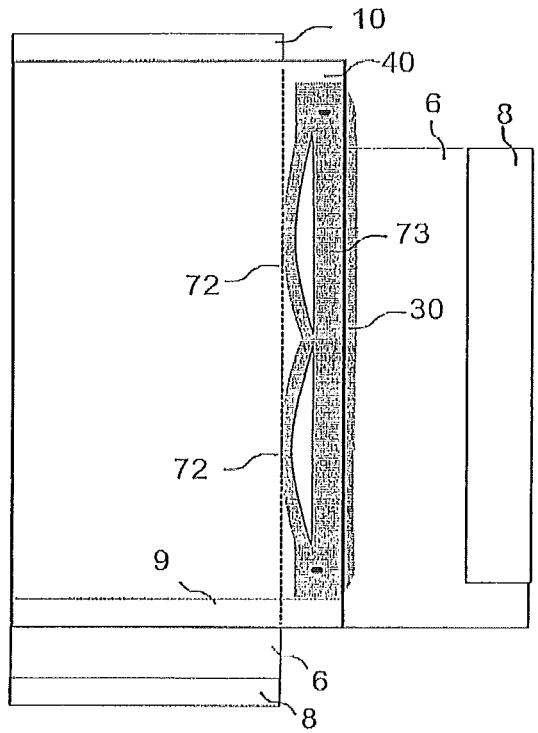
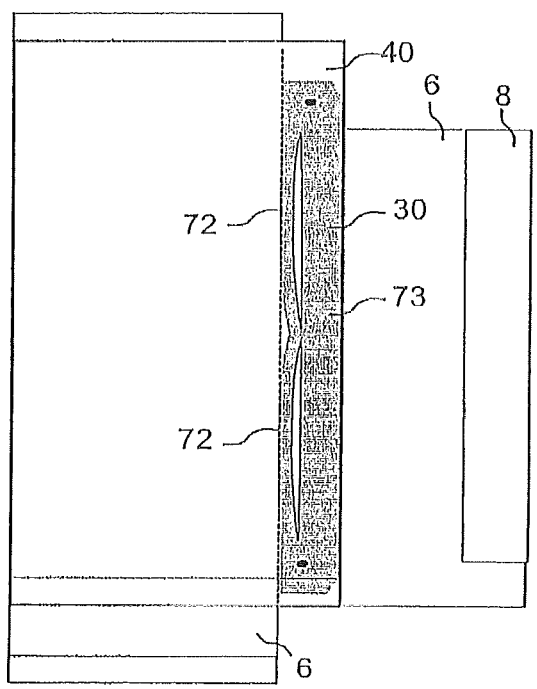

MECHANICAL LOCKING OF FLOOR PANELS

CROSS-REFERENCE TO RELATED APPLICATIONS

The present application is a continuation of U.S. application Ser. No. 11/952,212, filed on Dec. 7, 2007, which is a continuation-in-part of International Application No. PCT/SE2007/000836, which claims the benefit of U.S. Provisional Patent Application No. 60/869,181, filed on Dec. 8, 2006 and which claims priority of Swedish Application No. SE 0602645-4, filed on Dec. 8, 2006. The entire contents of each of U.S. application Ser. No. 11/952,212, International Application No. PCT/SE2007/000836, U.S. Provisional Patent Application No. 60/869,181, and Swedish Application No. SE 0602645-4 are incorporated herein by reference.

TECHNICAL FIELD

The invention generally relates to the field of floor panels with mechanical locking systems comprising a separate flexible tongue allowing easy installation. The invention provides new improved locking systems and installation methods for building panels, especially floor panels.

BACKGROUND

In particular, yet not restrictive manner, the invention concerns a mechanical locking system for rectangular floor panels with long and short edges. It should be emphasized that long and short edges are only used to simplify the description. The panels could also be square, they could have more than 4 edges and the adjacent edges could have angles other than 90 degrees. However, the invention is as well applicable to building panels in general. More particularly the invention relates to the type of mechanically locking systems which allow that all four edges of a panel could be locked to other panels by a single angling action comprising a flexible and/or displaceable and/or rotating tongue in order to facilitate the installation of building panels.

A floor panel of this type is presented in WO2006/043893, which discloses a floor panel with a locking system comprising a locking element cooperating with a locking groove, for horizontal locking, and a flexible tongue cooperating with a tongue groove, for locking in a vertical direction. The flexible tongue bends in the horizontal plane during connection of the floor panels and makes it possible to install the panels by vertical folding or solely by vertical movement. By "vertical folding" is meant a connection of three panels where a first and second panel are in a connected state and where a single angling action of a new panel, referred to as the "folding panel", connects two perpendicular edges of the new panel, at the same time, to the first and second panel. Such a connection takes place for example when a long edge of the first panel in a first row is already connected to a long edge of a second panel in a second row. The new folding panel is then connected by angling to the long edge of the first panel in the first row. This specific type of angling action, which also connects the short edge of the new folding panel and second panel, is referred to as "vertical folding". The short edges are generally connected horizontally with a strip comprising a locking element on a "strip panel" and a locking groove on the lower part of the folding panel cooperating with the locking element of the strip panel. It is also possible to connect two panels by lowering a whole panel solely by a vertical movement against another panel. This specific type of locking is referred to as "vertical locking"

Similar floor panels are further described in WO2003/016654, which discloses locking system comprising a tongue with a flexible tab. The tongue is extending and bending essentially in a vertical direction and the tip of the tab cooperates with a tongue groove for vertical locking.

Vertical locking and vertical folding of this type creates a separation pressure at the short edges when the flexible tongue or flexible parts of the tongue are displaced horizontally in a double action during the angling of the long edges. Parts of the tongue are displaced inwardly during the initial part of the locking and they are thereafter displaced towards the initial position during the final part of the locking action. The inventor has analyzed several types of floor panels and discovered that there is a considerable risk that the short edges could be pushed away from each other during installation and that a gap could occur between the edge portions of the short edges. Such a gap could prevent further installation and the floor panels will not be possible to connect. It could also cause serious damage to the locking system at the short edges. Pushing the floorboards sideways towards the short edges during installation could prevent the gap. Such an installation method is however complicated and difficult to use since three actions have to be combined and used simultaneously in connection with angling down of the long edges as described below.

a) The edges of a new floor panel has to be brought in contact with a first floor panel laying on the floor and the long edge of the new panel has to be pressed forward in angled position towards the first panel b) The new panel has to be displaced sideways, in the pressed and angled up position, and pressed sideways against a short edge of a second panel laying on the floor in order to counteract the counter pressure of the tongue c) The new panel must finally be angled down to the floor and the forward and sideways pressure must be maintained during the angling action.

The inventor has discovered that separation and installation problems often occur when the panels have a small thickness and small compact locking systems on the long edges or when the panel core is made of a material with smooth surfaces such as high density fibreboard (HDF). Such problems could also occur when the panels are short or in connection with the installation of the first or last panel in each row since such installation is generally made with panels which are cut to a smaller length in order to adapt the floor to the wall position. Separation problems are of course extremely difficult to handle in any type of panels using locking systems with a strong flexible tongue that creates a substantial horizontal separation pressure during the vertical folding. Such strong tongues are very important in many applications where a high quality vertical connection is required and panels with such flexible tongues are very difficult to install with the known installation methods.

The invention aims to solve separation problems in floorings, which are intended to be installed with vertical folding or vertical locking or just angling of long edges.

Vertical folding according to known technology locks the panels vertically when they are angled down. The panels are possible to unlock. This could be done with special tools, which are inserted into the locking system. It is also possible to angle up a whole row and to disconnect panels from each other. It would be an advantage if individual panels could be locked and unlocked in an easier way, preferably with a simple reverse angling action. Damaged panels or incorrectly installed panels could be adjusted, exchanged or reinstalled.

Another objective of the invention is therefore to provide solutions to this problem with a new locking system that after the vertical folding is not connected vertically and that could be released with a simple angling in the reverse direction.

Vertical folding according to known technology requires that some parts of the locking system are bended, compressed or displaced when the panels are angled down. This creates a resistance, which is a disadvantage during installation. A third objective of the invention is to provide solutions that avoids such resistance as much as possible and where preferably all types of resistance caused by the vertical locking parts during the vertical folding are reduced considerably or completely eliminated.

Different types of floorboards require different locking solutions. A locking system adapted to lock thin laminate floorings of 5-8 mm with a core of HDF is not always possible to use to lock for example thick wood floorings with a thickness of 14-25 mm and with a core of various types of wood spices and qualities. A fourth objective is to provide solutions suitable for a wide range of different floor types and different sizes of the same floor type.

Definition of Some Terms

In the following text, the visible surface of the installed floor panel is called "front face", while the opposite side of the floor panel, facing the sub floor, is called "rear face". The edge between the front and rear face is called "joint edge". If not defined otherwise upper and lower means towards the front face and towards the rear face. Inner and outer means towards or away from the centre of the panel. By "horizontal plane" is meant a plane, which extends parallel to the outer part of the surface layer. Immediately juxtaposed upper parts of two adjacent joint edges of two joined floor panels together define a "vertical plane" perpendicular to the horizontal plane. By "horizontally" is meant parallel with the horizontal plane and by "Vertically" parallel to the vertical plane.

By "joint" or "locking system" are meant co acting connecting means, which connect the floor panels vertically and/or horizontally. By "mechanical locking system" is meant that joining can take place without glue. Mechanical locking systems can in many cases also be combined with gluing. By "integrated with" means formed in one piece with the panel or factory connected to the panel. By "separate" parts, components element and similar is meant that they are produced separately and not in one piece with the core or the main body of the panel. Separate parts are generally factory connected and integrated with the panel but they could be supplied as lose parts, which are intended to be used during installation of panels.

By a "flexible tongue" is meant a separate tongue which has at least some flexible parts and which has a length direction along the joint edges and which is forming a part of the vertical locking system. The whole tongue could for example be bendable or it could have flexible and resilient parts that can be bent and/or compressed and that could at least partly spring back to or towards its initial position. The flexibility causes the tongue to be displaced at least partly horizontally during locking. Flexible tongue is used in this document broadly since most of the shown embodiments have at least some flexible parts. The invention does not exclude a flexible tongue, which essentially or partly is made of a rigid material.

By a "displaceable tongue" is meant any type of a tongue which connects adjacent edges vertically and which is made of a separate material and connected to a floor panel and which is wholly or partly displaceable between an unlocked position and a locked position. A displaceable tongue could be flexible or rigid By "tongue" is meant any part in an edge section that prevents a vertical displacement.

By "angling" is meant a connection that occurs by a turning motion, during which an angular change occurs between two parts that are being connected, or disconnected. When angling relates to connection of two floor panels, the angular motion takes place with the upper parts of joint edges at least partly being in contact with each other, during at least part of the motion.

By an "angling locking system" is meant a mechanical locking system which could be connected vertically and horizontally with angling comprising a tongue and a groove that locks two adjacent edges in a vertical direction and a locking strip with a locking element in one edge of a panel called "strip panel" that cooperates with a locking groove on another edge of a panel called "groove panel" and locks the edges in a horizontal direction. The locking element and the locking groove have generally rounded guiding surfaces that guide the locking element into the locking groove and locking surfaces that locks and prevents horizontal separation between the edges.

Vertical folding is not a pure combination of for example an angling locking system on a long edges and a vertical locking system on short edges since the vertical and the angling actions are combined and the short edges are folded together in the same way as scissors. The locking takes place gradually from one edge section adjacent to one long edge, which is angled, to the other edge section adjacent to the other opposite long edge.

Such locking of two adjacent edges is defined as a "folding lock" "Vertical folding" is a locking of three panels where combinations of angling on long edges and folding on short edges is used. By "vertical folding along the vertical plane" is meant a vertical folding with the upper edges of two short edges essentially in contact during the essentially the whole folding action until the edges are locked together.

SUMMARY

The present invention aims at a set of building panels, especially floor panels or a floating flooring with a mechanical locking system comprising a separate displaceable tongue on the short edge which is configured to improve installation and disconnection of floor panel installed with vertical folding or angling and which will counteract or prevent separation of the short edges during installation.

The invention is based on a first basic understanding that such separation problems are related to the separate displaceable tongue in a folding lock, which has to be pressed inwardly into the displacement groove in order to snap back horizontally towards the tongue groove during the vertical folding. The objective of the invention is to provide a locking system that could be locked with vertical motion or angling of an adjacent edge and where the separation force of the displaceable tongue during vertical motion or angling is reduced considerably or preferably eliminated due to the fact that the inwardly directed displacement of the displaceable tongue into the displacement groove during installation is reduced considerably or completely eliminated.

The invention provides for new embodiments of locking systems at short edges according to different aspects offering respective advantages. Useful areas for the invention are wall panels, ceilings, exterior applications and floor panels of any shape and material e.g. laminate; especially panels with surface materials contain thermosetting resins, wood, HDF, veneer or stone.

The invention comprises according to a first basic principle a set of floor panels comprising a locking system with a displaceable tongue integrated with an edge of a floor panel for connecting the edge vertically to an adjacent edge of a similar panel. The displaceable tongue is configured to be displaced essentially horizontally and essentially in one direction only from the initial position to a final outer locked position into a tongue groove.

The invention comprises according to a first embodiment a set of essentially identical floor panels provided with first and second connectors, the connectors are integrated with the floor panels and configured to connect adjacent edges. The first connector comprises a locking strip with an upwardly directed locking element at an edge of one floor panel and a downwardly open locking groove at an adjacent edge of another floor panel for connecting the adjacent edges in a horizontal direction perpendicular to the adjacent edges, the second connector comprises a displaceable tongue at an edge of one floor panel, and a horizontally open tongue groove in an adjacent edge of another floor panel for connecting the adjacent edges in vertical direction, the connectors are configured to be locked with angling or a vertical motion. A locking part of the displaceable tongue is arranged in an inner initial position in a displacement groove at an edge of a panel. The locking part is configured to be displaced essentially horizontally and essentially in one direction only from the initial position to a final outer locked position into the tongue groove.

One essential difference against known technology is that at least a part of a tongue is displaced essentially in one direction only from the initial unlocked position, where it has been factory connected to an edge, and to the locked position where it locks the edges vertically. The locking is a "single snap action" or a "single displacement action" Known flexible and displaceable tongues are first displaced inwardly into the displacement groove and then outwardly into the tongue groove. These two displacements are generally of the same magnitude. In several cases the first displacement is even larger than the second displacement, for example when the locking is made with pre pension against a part of the tongue groove. Such a locking is a "double action snap". The major advantage of a single snap action or a single displacement action is that locking could be accomplished without any separation forces that will push for example the short edges apart during locking and installation.

The expression "essentially in one direction only" means that some double action embodiments are covered by the invention and are not excluded preferably in such cases where a first displacement into the displacement groove is essentially smaller than the second displacement into the tongue groove. The first displacement could for example be used to release the displaceable tongue from its inner unlocked position or just to accomplish a part of a displacement to an unlocked or partly locked position.

According to a first aspect of the first principle the invention provides a set of floor panels comprising a locking system with a separate flexible tongue integrated with an edge of a floor panel for connecting the edge vertically to an adjacent edge of a similar panel. A part of the tongue is configured to be displaced essentially horizontally and essentially in one direction only from an initial position to a final outer locked position. The tongue is configured to be twisted along the joint during locking.

According to an embodiment of the first principle, the invention provides for a flexible tongue having a knee joint with a pressing extension extending essentially horizontally from the knee joint and a locking extension extending essentially vertically from the knee joint upwards. The locking extension has a locking part at an upper part above the knee joint. The locking part locks in the tongue groove when for example an adjacent short edge of the first and second panels is pressed vertically against the pressing extension until the short edges are positioned in an essentially the same plane.

The vertical pressing against the pressing extension is preferably caused by vertical folding.

According to a second aspect of the first principle A set of floor panels are provided comprising a locking system with a separate flexible tongue integrated with an edge of a floor panel for connecting the edge vertically to an adjacent edge of a similar panel. The flexible tongue comprises parts under pre tension.

According to an embodiment of the second aspect floor panels are provided with for example short edges having a locking system with a separate flexible tongue that locks with a single action. A vertical movement of one short edge causes a part of a displaceable tongue to snap essentially in one direction from an inner initial unlocked position, where the displaceable tongue is connected to a displacement groove with pre tension, to an outer vertically locked position. The release of the pre tension is preferably caused by vertical folding.

According to a third aspect of the first principle, a set of floor panels are provided comprising a locking system with a separate tongue integrated with an edge of a floor panel for connecting the edge vertically to an adjacent edge of a similar panel. At least a part of the tongue is displaceable and the locking is accomplished by a sideway pressure applied at an edge section of the tongue and essentially along the edge.

According to one embodiment of this third aspect the invention comprises a displaceable tongue, which is displaced in a displacement groove. The invention is characterized in that the displacement of the displaceable tongue from an initial unlocked position, where it is factory connected, and into a tongue groove is caused by for example a long edge of a third panel which is angled and connected to the first and second panels when they are located in essentially the same plane and with their short edges in contact.

This third aspect allows that the panels are unlocked vertically until a third panel in a consecutive row is connected. Vertical folding and disconnection with angling down and up again could be made in a simple way since there is no tongue that creates any resistance and that locks vertically. The vertical locking is initiated first when a new row of panels are installed. This is a major advantage against all known fold down systems that have a vertical locking. Locking systems according to this principle could be made with a displaceable tongue, on for example the short edge of a panel, that returns to the initial unlocked position when a long edge of a panel in an adjacent row is released with for example angling up. This allows that the whole floor could be disconnected with a simple angling action of individual panels. It is not necessary, as with the known technology, to disconnect the whole row with angling in order to disconnect a floor. Alternatively the locking system can be configured so that the bendable stays in its outer position, due to friction between the tongue and the panels or by permanent deformation of the tongue, even if the third panel is removed.

All these three basic embodiments where the displacement is caused by:

a) pressing on a pressing extension,
b) releasing a pre tension,
c) and displacing a tongue on the short edge with the long edge, are based on the major principle that the displacement is essentially in one direction only and that such a displacement could be made with only very limited or nonexistent separation forces.

The above-mentioned aspects have been described with panels having long and short edges. The panels could have more than four edges and they could be square.

According to a second principle, the invention provides a method to install and disconnect floor panels with an angling locking system on for example long edges and a displaceable tongue on the short edges. The method comprises the step of:

1. Connecting the long edges of a second and a new panel in a second row to a long edge of a first panel in a first row such that the short edges of the second and new panel in the second row are in contact and in essentially the same plane; and
2. Connecting a third panel in a third row with angling to the long edges of the second and new panels whereby a displaceable tongue on the short edge of the second or new panel is displaced into a tongue groove such that the short edges are locked vertically and horizontally.

According to this second principle, the invention provides a method to disconnect floor panels with an angling locking system on for example long edges and a displaceable tongue on the short edges, which connect floor panels vertically. The method comprises the step of:

1. Disconnecting the long edges of a third panel in a third row from a long edge of a second and new panel in a second row and disconnecting a displaceable tongue and the vertical locking between a new panel and a second panel in a second row with angling up of the third panel away from the sub floor; and
2. Disconnecting the new panel from the long edges of a first panel in a first row and from the short edges of the second panel with angling up.

According to a third principle, the invention provides panels and locking systems with a horizontal flexible or displaceable locking element which allows the panels to be connected with a horizontal displacement towards each other in an essentially common plane according to the same basic principles as used for the vertical folding as described in this document. The locking element is displaced vertically and locks in a horizontal direction into a locking groove located in an upper or lower part of an upper or lower lip. The locking in the vertical direction is preferably accomplished with a tongue and a groove. This third principle is only schematically described in this document since all embodiments and principles which are used for the vertical locking could be used for the horizontal locking. It is obvious that parts cooperating horizontally should be adjusted to vertically etc.

A second aim of the invention is to provide new and improved embodiments of separate flexible tongues that could be used in all types of locking systems where a displacement of at least a part of a tongue is required in order to accomplish a vertical or horizontal locking of panels. The aim is to improve the locking function and the locking strength compared to know technology.

The invention provides a flexible tongue having a length direction. At least one of the edges extending in the length direction is rigid. The flexible tongue has in the length direction one or several flexible cavities which could be compressed and spring back towards the initial position The invention is useful in all types of floorings and especially in floorings where it is difficult to prevent separation by for example friction between long edges or where known tongues create high separation forces. The invention is therefore especially suitable for short panels for example 40-120 cm where the friction along the long edges is low, for wide panels with a width of more than 20 cm since known flexible tongues are long and will create an extensive tongue pressure, and for panels with for example a core of HDF, compact laminate or plastic materials and similar where the friction is low due to very smooth and low friction surfaces in the locking system. The invention is also useful in thin panels, for example with a thickness of 6-9 mm, and especially is such panels with compact locking systems on long edges, for example with locking strips shorter than 6 mm, since such floor panels and such locking system will have small contact surface with low friction.

Several advantages could be reached with a flooring system configured according to one or several of the principles described above. A first advantage consists in that installation could be made in a simple way and no sideway pressure has to be applied during installation in order to prevent floorboards to separate at the short edges. A second advantage is that the risk of edge separation, which could cause cracks in the locking system during folding, is reduced considerably. A third advantage is that locking systems could be formed with more rigid and stronger tongues that could lock the panels vertically with higher strength. A fourth advantage is that locking and unlocking could be made easier and with a more reliable locking function.

A tongue could comprise of plastic material and could be produced with for example injection moulding. With this production method a wide variety of complex three-dimensional shapes could be produced at low cost and the flexible tongues may easily be connected to each other to form tongue blanks. A tongue could also be made of an extruded or machined plastic or metal section, which could be further shaped with for example punching to form a flexible tongue. The drawback with extrusion, besides the additional productions steps, is that it is difficult but not impossible to reinforce the tongue, e.g. by fibres. Extruded plastic section could however be a preferred alternative when the tongue has a cross section, which is essentially of a rectangular shape. Wood based material such as for example HDF or compact laminate or sheet shaped plastic material could also be used to form a flexible or displaceable tongue.

Any type of polymer materials could be used such as PA (nylon), POM, PC, PP, PET or PE or similar having the properties described above in the different embodiments. These plastic materials could, when for example injection moulding is used, be reinforced with for instance glass fibre, Kevlar fibre, carbon fibre or talk or chalk. A preferred material is glass fibre, preferably extra-long, reinforced PP or POM.

The short edges could be disconnected with a needle shaped tool, which could be inserted from the corner section into the tongue groove and press the flexible tongue back into the displacement groove. One panel could then be angled up while the other panel is still on the sub floor. Of course the panels could also be disconnected in the traditional way by angling up or displacement along the joint All references to "a/an/the [element, device, component, means, step, etc.]" are to be interpreted openly as referring to at least one instance of said element, device, component, means, step, etc., unless explicitly stated otherwise.

Almost all embodiments are described with separate tongues on the strip panel mainly in order to simplify the description. The separate tongue could be located in the edge of the folding panel.

BRIEF DESCRIPTION OF THE DRAWINGS

FIGS. 3a-b show a floor panels with a prior art mechanical locking system on a short edge.

FIG. 4 show how short edges of two floor panels could be locked with vertical folding according to prior art.

FIG. 9a-b show a displaceable tongue according to an embodiment of the second aspect of the invention.

FIG. 9c-g show embodiments according to the third aspect of the invention.

FIG. 10a-d show embodiments according to the third aspect of the invention.

FIG. 14a-h show embodiments of a flexible tongue.

FIG. 18a-i show embodiments of flexible and displaceable tongues.

FIG. 21a-d show embodiments of flexible and displaceable tongues.

FIG. 23a-c show embodiments of a displaceable tongue.

FIG. 25a-b show a flexible tongue with a rigid part.

FIG. 27 shows a schematic illustration of an embodiment of a needle shaped tool.

DETAILED DESCRIPTION OF EMBODIMENTS

FIGS. 1-4 and the related description below describe published embodiments and are used to explain the major principles of the invention. The showed embodiments are only examples.

A prior art floor panel 1, 1' provided with a mechanical locking system and a flexible tongue 30 is described with reference to FIGS. 1a-1d.

Figure 1A:
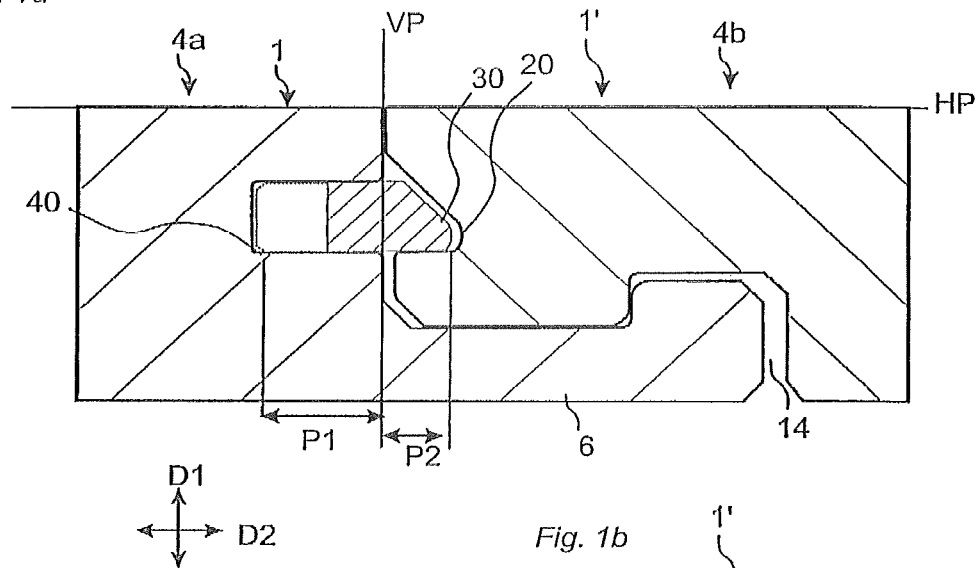
FIGS. 1a-d illustrate a prior art locking system.
Figure 1C:
Figure 1B:
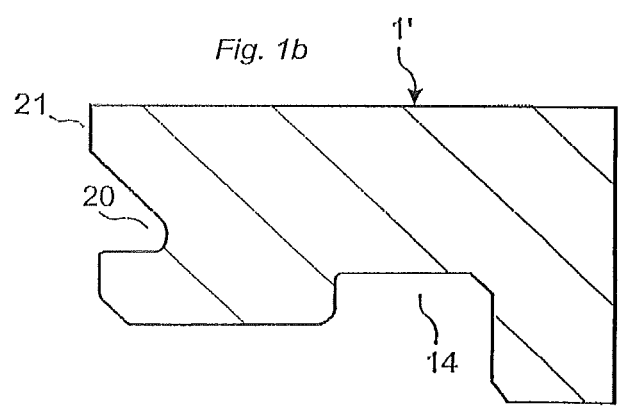
Figure 1D:
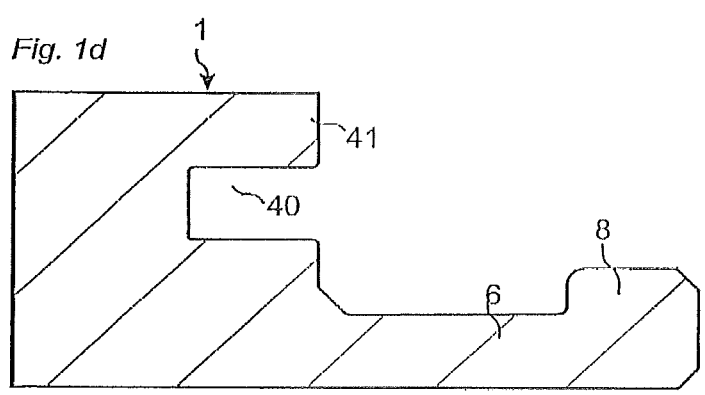

FIG. 1a illustrates schematically a cross-section of a joint between a short edge joint edge 4a of a panel 1 and an opposite short edge joint edge 4b of a second panel 1'.

The front faces of the panels are essentially positioned in a common horizontal plane HP, and the upper parts 21, 41 of the joint edges 4a, 4b abut against each other in a vertical plane VP. The mechanical locking system provides locking of the panels relative to each other in the vertical direction D1 as well as the horizontal direction D2.

To provide joining of the two joint edges in the D1 and D2 directions, the edges of the floor panel have in a manner known per se a locking strip 6 with a locking element 8 in one joint edge, hereafter referred to as the "strip panel" which cooperates with a locking groove 14 in the other joint edge, hereafter referred to as the "fold panel", and provides the horizontal locking.

The prior art mechanical locking system comprises a separate flexible tongue 30 fixed into a displacement groove 40 formed in one of the joint edges. The flexible tongue 30 has a groove portion P1, which is located in the displacement groove 40 and a projecting portion P2 projecting outside the displacement groove 40. The projecting portion P2 of the flexible tongue 30 in one of the joint edges cooperates with a tongue groove 20 formed in the other joint edge.

FIG. 3a shows a cross section A-A of a panel according to FIG. 3b seen from above. The flexible tongue 30 has on one of the edge sections a friction connection 36 which could be shaped for instance as a local small vertical protrusion. This friction connection keeps the flexible tongue in the displacement groove 40 during installation, or during production, packaging and transport, if the flexible tongue is integrated with the floor panel at the factory.

Figure 2A:
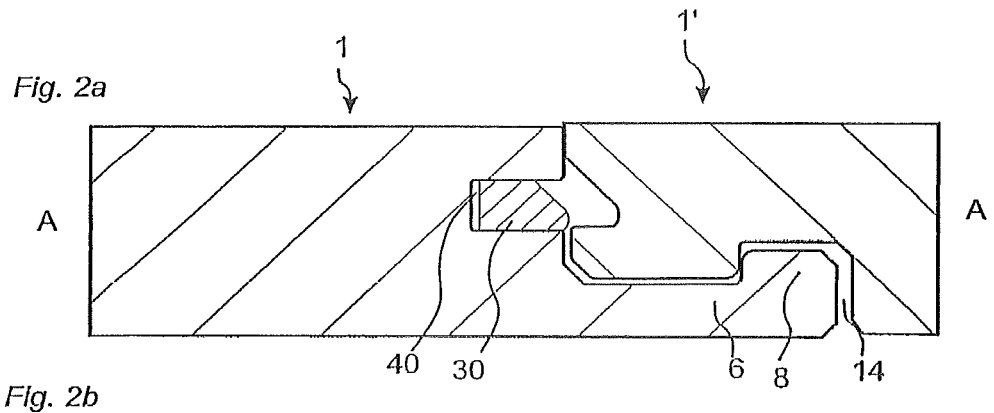
FIGS. 2a-b show a prior art flexible tongue during the locking action.
Figure 2B:
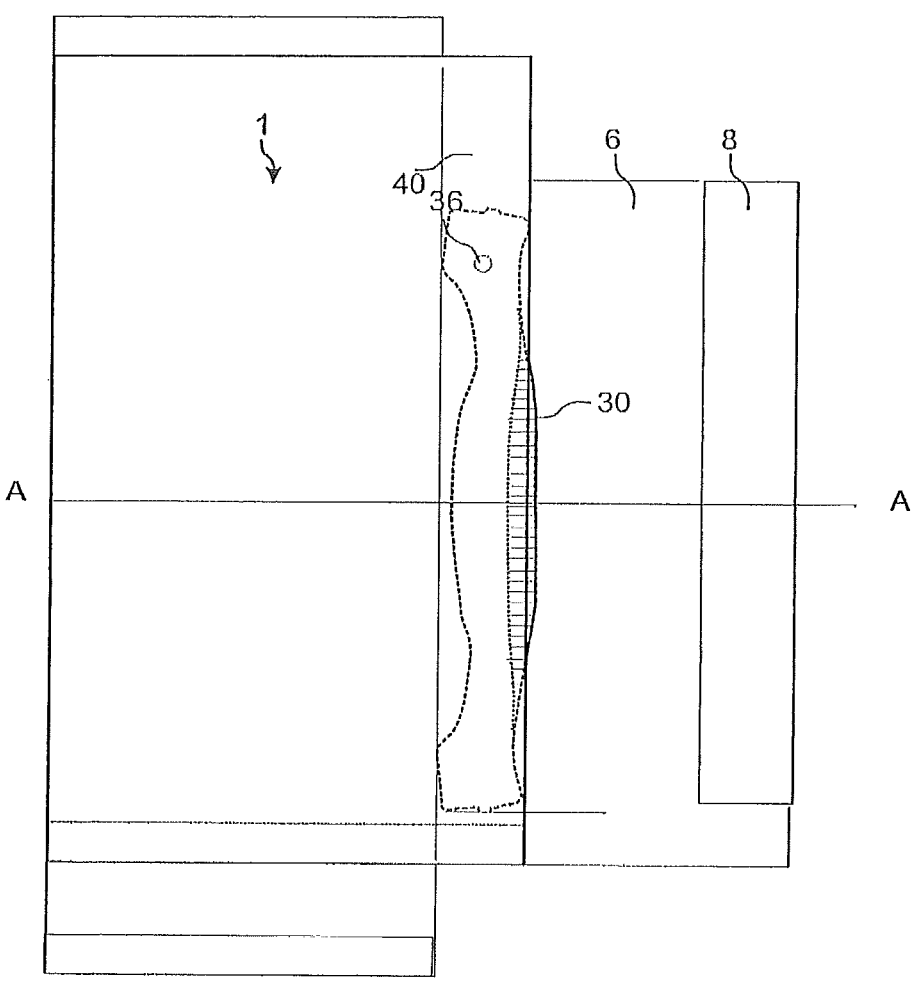

FIGS. 2a and 2b shows the position of the flexible tongue 30 after the first displacement towards the bottom of the displacement groove 40. The displacement is caused essentially by bending of the flexible tongue 30 in its length direction by the folding panel and such bending creates separation forces that could cause the long edges to slide and the short edges to separate during folding.

FIG. 4 shows one embodiment of a vertical folding. A first panel 1" in a first row R1 is connected to a second 1 panel in a second row R2. A new panel 1' is moved with its long edge 5a towards the long edge 5b of first panel 1" at a normal installation angle of about 25-30 degrees, pressed to the adjacent edge and connected with its long edge 5a to the long edge 5b of the first panel with angling. This angling action also connects the short edge 4b of the new pane 1' with the short edge 4a of the second panel 1. The fold panel 1' is locked to the strip panel 1 with a combined vertical and turning motion along the vertical plane VP and with a contact between the top edges of the second panel 1 and the new panel 1'.

Figure 5A:
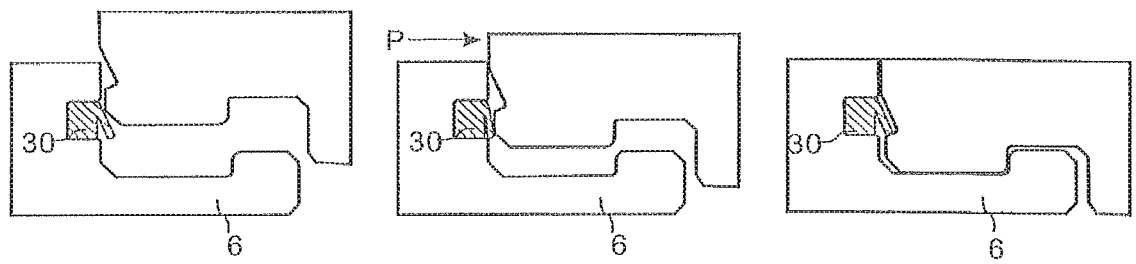
FIGS. 5a-d show embodiments of short edge locking systems which create a separation force during locking.
Figure 5B:
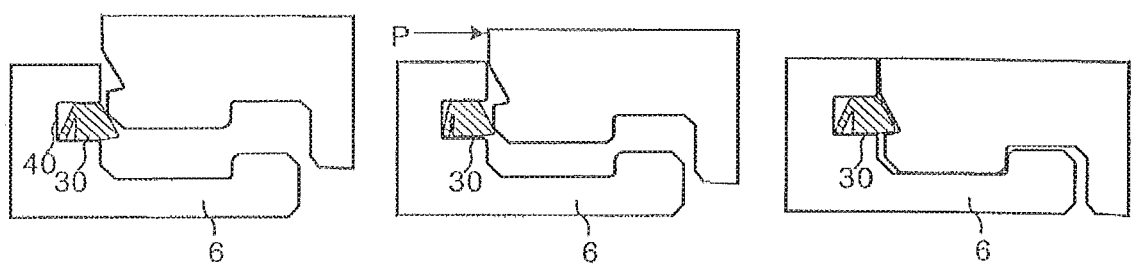
Figure 5C:
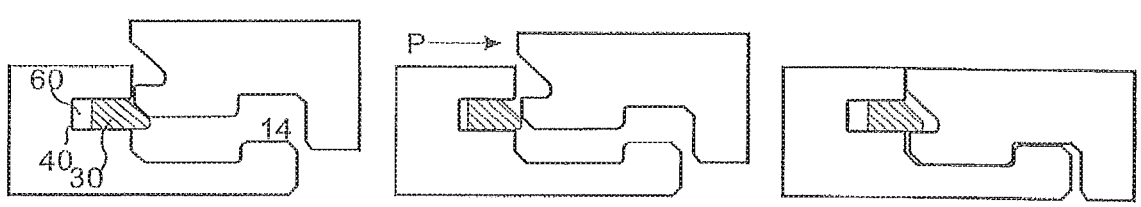
Figure 5D:
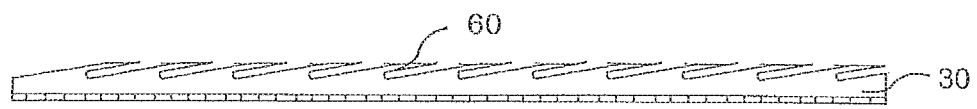

FIGS. 5a-5c shows known examples of flexible tongues 30, which could be used to lock short edges according to known technology. FIG. 5a shows a separate tongue 30 on the strip panel with a flexible snap tab extending downwards. FIG. 5c shows a separate tongue with a flexible snap tab inside a displacement groove 40. The snap tab could extend upwards or downwards and could be on the strip panel or on the folding panel. FIG. 5 c shows a flexible tongue 30 comprising protrusions 60, as shown in FIG. 5d and these protrusions could be located in the displacement groove 40 or extend from the vertical plane into the tongue groove 20. All these embodiments will create a separation pressure P when the flexible parts of the tongue are pressed inwardly towards the bottom of the displacement groove and this could cause the short edges to separate such that the locking system will be damaged or such that the panels will not be possible to install.

Figure 6A:
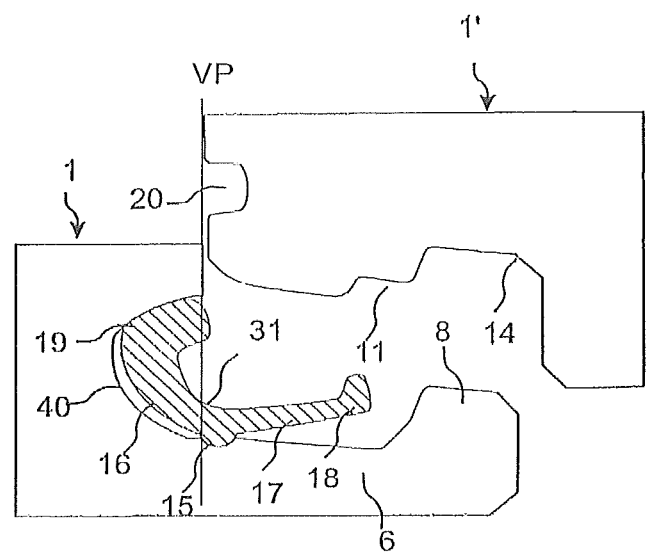
FIG. 6 a-d shows an embodiment according to the first aspect of the invention.
Figure 6B:
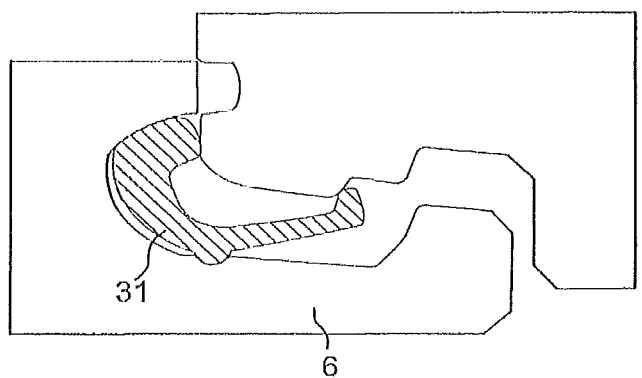
Figure 6C:
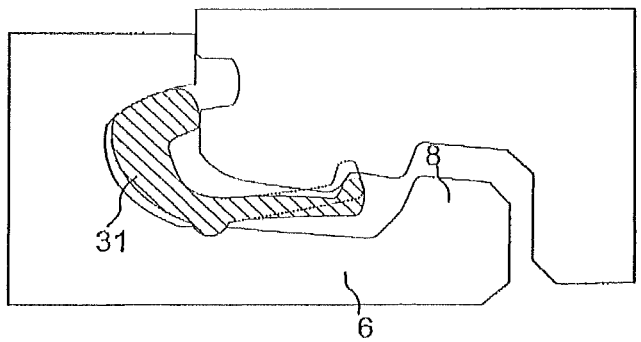
Figure 6D:
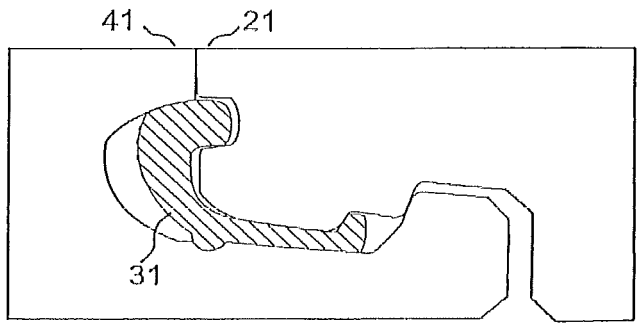

FIG. 6a-d shows embodiments of panels with a locking system according to the first aspect of the invention. The strip panel 1 has a locking strip 6 with a locking element 8 and a flexible tongue 30, which is connected to a displacement groove 40. The flexible tongue 3o has a knee joint 15 with a lower pressing extension 17 extending essentially horizontally outwards from the vertical plane VP, comprising a press locking element 18. The knee joint has also a locking extension 16 extending essentially vertically with a locking part 19 in the upper part of the locking extension 16. The folding panel 1' has a locking groove 14 which cooperates with the locking element 8 and locks the panels horizontally and a press locking groove 10 which cooperates with the press locking element 18 and prevents horizontal displacement between the folding panel 1' and the displaceable locking element 31. The folding panel 1' has also a tongue groove which cooperates with the locking part 19 and locks the panels 1. 1" vertically. The pressing extension 17 will be bended downwards with the press locking element 18 locked to the press locking groove 11 when the folding panel 1' is moved vertically downwards towards the strip panel 1 essentially along the vertical plane VP as shown in FIGS. 6b and c. The locking part 19 will finally snap into the tongue groove 20 when the upper parts of the joint edges 21, 41 are essentially in the same horizontal plane and the panels 1, 1' will be locked vertically D1 and horizontally D2 without any horizontal pressure that could displace the edges away from each other during the vertical folding. The bending of the pressing extension 17 and the flexibility of the flexible tongue 30 allowing the pressing extension and the locking part to separate at least slightly from each other during locking is an essential feature that allows a high quality locking with the upper edges locked in a common plane. The locking system according to the invention is a vertical snap system. The tongue will during the vertical folding twist in the length direction. The edge which is close to the long side which is connected with angling (4b1 in FIG. 4) will during the vertical folding obtain a position as shown in FIG. 6c while the other edge (4b2 in FIG. 4) will be in a position as shown in FIG. 6a. The bending of the pressing extension 17 will vary along the length of the tongue 31. Even a small bending of some 0.1 mm could improve the locking function and quality considerable and allows that gaps or vertical play is reduced considerably or preferably excluded.

Figure 7A:
FIG. 7a-c shows in a 3D embodiments of the flexible tongue according to the first aspect of the invention.
Figure 7B:
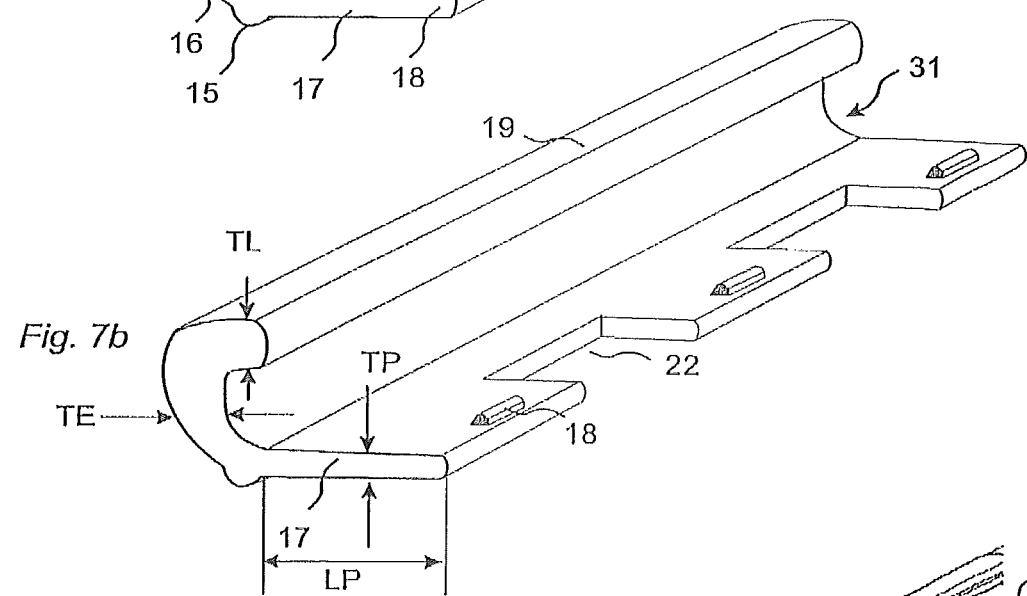
Figure 7C:
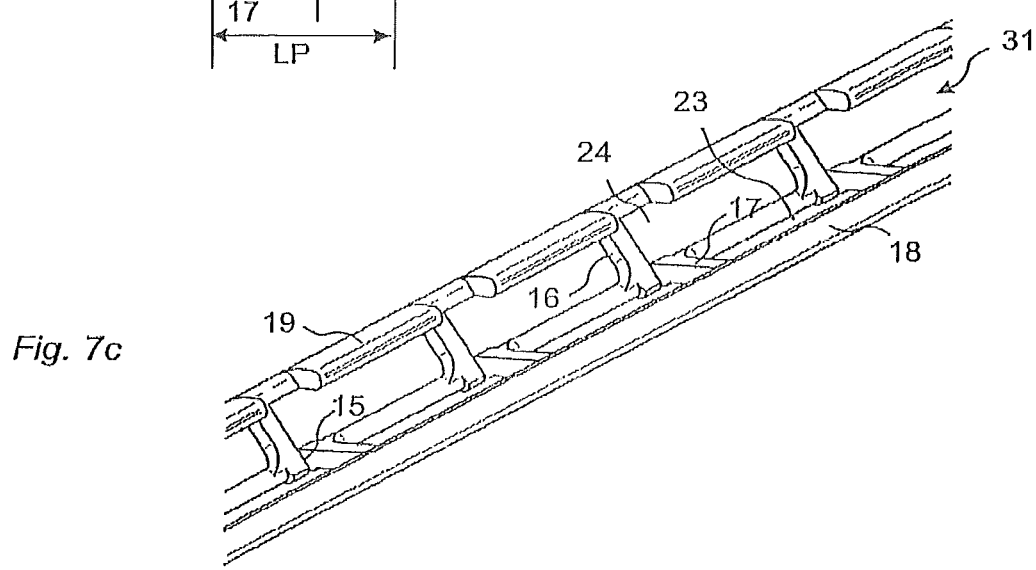

FIGS. 7a-c show flexible tongues. FIG. 7a show a flexible tongue 30, which could for example be made by extrusion. FIG. 7 b show an embodiment, which could be produced by a combination of extrusion and mechanical forming such as punching or cutting. Parts of the lower extension 22 could be removed in order to increase flexibility and twisting of the lower extension. This means that the length LP of the pressing extension will vary along the flexible tongue 30. FIG. 7c shows another embodiment, which is made by injection moulding. The locking extension and the pressing extension have apertures 24, 23 or alternatively thinner sections which facilitates flexibility since twisting in the length direction of the displaceable tongue could be used to make parts more bendable with maintained locking strength. This means that the thickness of the locking part TL, and/or the locking extension TE and/or the pressing extension TP could vary along the flexible tongue 30.

Several alternatives are possible within the main principle of the invention. The press locking element 18 could also have a downwardly extending protrusion 18' such that it could lock into a locking groove 14' located on the upper part of the strip 6, similar to the embodiment shown in FIGS. 11a and 11f. A horizontal locking could be accomplished without the use of a large locking element 8 and this could give lower costs due to less material waste and possibilities to use the invention in very thin floorings for example thinner than 7 mm. The pressing extension 17 could have various lengths and it could cover a part or even the whole locking element 8 as shown by the dotted lines in FIG. 6d.

Figure 8A:
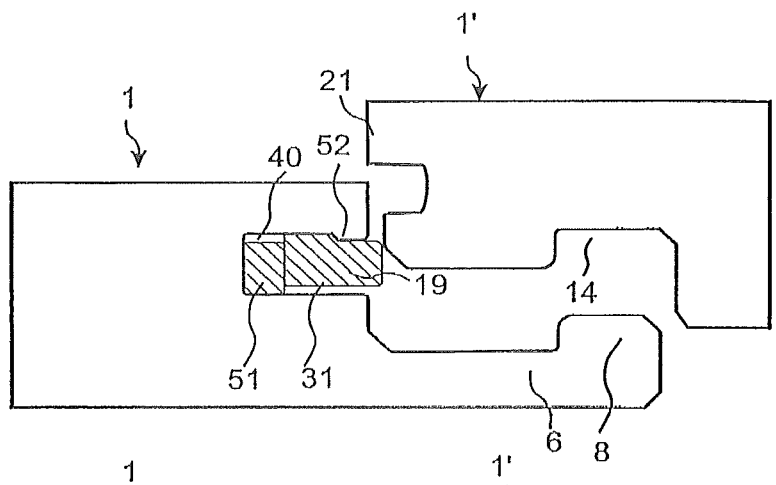
FIG. 8a-d show an embodiment of the second aspect of the invention.
Figure 8B:
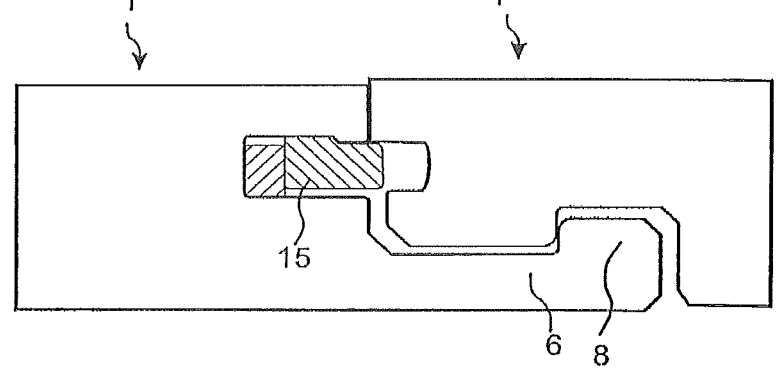
Figure 8C:
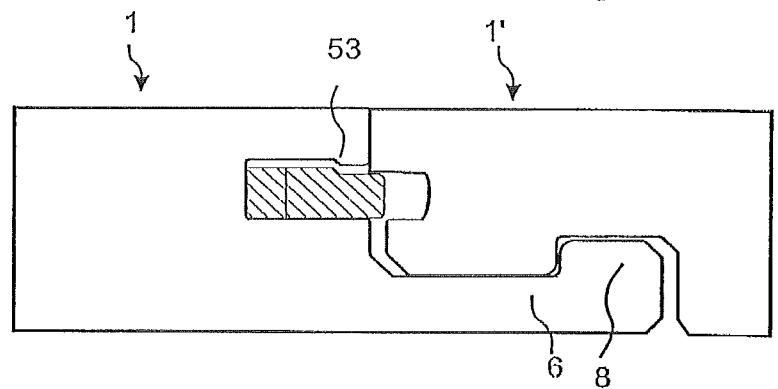
Figure 8D:
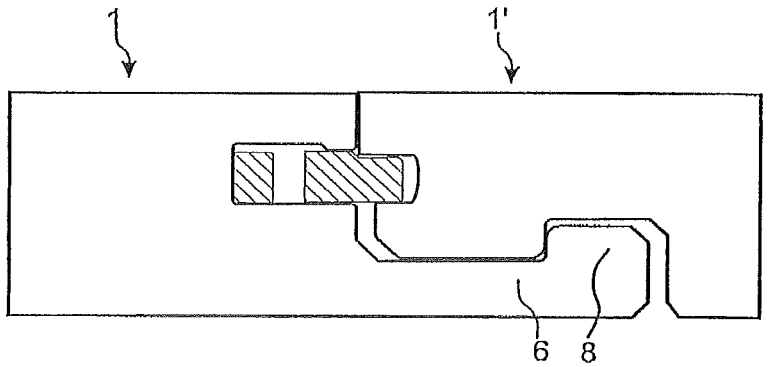

FIG. 8a-d show an embodiment according to the second aspect of the invention. The flexible tongue 30 has an inner unlocked position and an outer locked position. The flexible tongue 30 is in its unlocked position fixed into the displacement groove with pre tension caused for example by an flexible tongue part 51 that presses the flexible tongue 30 upwards. A horizontal tongue lock 52 on the flexible tongue 30 cooperates with a horizontal groove lock 53 in the displacement groove 40 and prevents the flexible tongue 30 to snap out towards its final locked position. The groove lock could be formed with various angles. A scraping tool could for example be used to form surfaces with high locking angles. The flexible tongue snaps out towards the locked position where the locking part 19 locks in the displacement groove when an upper part 21 of the short edge on the folding panel 1' moves a part of the flexible tongue downwards and releases the horizontal tongue and groove locks 52,53 as shown in FIGS. 8b,c. Several alternatives with different shapes of flexible parts, locking means and releasing means could be used to create a pretension of the flexible tongue, to lock the tongue to the displacement groove and to release the flexible tongue so that it snaps towards its locked position. The flexible parts could be made of the same material as the flexible tongue or of separate flexible materials connected to the tongue or the displacement groove. Horizontal separation forces are generally not present in this type of single snap actions where the tongue is displaced essentially in one direction. Even in the case when the pre tension would be released when the fold lock is not completely locked, separation problems will be reduced since the locking element 8 of the strip panel is partly in the locking groove 14 of the fold panel and prevents separation. This is shown in FIG. 8b.

FIG. 9a show an embodiment of the flexible tongue seen from above and FIG. 9b show the same embodiment seen from the panel edge parallel with the horizontal plane. The protrusion 51 is a flexible part that extends both horizontally and vertically and could therefore press the flexible tongue in these both directions in order to lock the flexible tongue with pre tension and to displace it to the final locked position.

FIGS. 9c and 9e shows an embodiment of the third aspect of the first principle seen in the same way as described above. A displaceable tongue is provided which has one or more essentially horizontal protrusions 60 with friction connections 36 which hold the displaceable tongue 31 fixed to the displacement groove 40. The displaceable tongue 31 will be displaced with its locking part 19 in the displacement groove with a turning motion essentially around the friction connections on the protrusions when a sideway pressure P is applied at an pressing edge 32 on the displaceable tongue as shown in FIG. 9e. This turning motion will also displace the displaceable tongue into the tongue groove 20. Several other alternatives could be used to obtain a displacement with a sideway pressure. The displaceable tongue could be combined with one or several separate wedge shaped elements which could be used to displace and push a displaceable tongue into the tongue groove when the tongue or the separate element is displaced sideways. Other alternatives are displaceable tongues with parts that hold the tongue in the displacement groove during transport and which are intended to be separated from the tongue when a sideway pressure is applied. The known bow shaped tongue, as shown in FIG. 3b, could of course also be used. A side pressure will bend the tongue and the protruding part P2 will be displaced perpendicular to the length direction of the tongue. All known principles, where a sideway pressure is used to accomplish a perpendicular displacement, could be used to displace a locking part into a tongue groove. All embodiments shown in this document are based on the following three principles The link principle where a turning around a centre points is used to accomplish the displacement The wedge principle where two wedges slide against each other The bending principle where parts are bended to a bow shaped form.

These three principles could be combined and a displaceable tongue could have parts where the link, wedge and bending principles are used to convert a sideway pressure to a perpendicular displacement in order to bring parts of a tongue into a groove and to lock floorboards vertically or horizontally.

This third aspect of the invention offers the advantages that all parts of the displaceable tongue could be made rigid. Flexible tongues or flexible parts are however preferred in several applications.

FIG. 9f show an embodiment where the pressing edge 32 is exposed at the long edge 5b of a second panel 1 which is connected to a first panel 1". A new panel 1' is connected with angling to the long edge of the first panel 1" and laid flat on the sub floor such that the short edges 4a, 4b of the second an new panels are in the same plane. A third panel 1a as shown in FIG. 9g could now be connected with angling to the long edges 5b of the second 1 and new panels 1' and the pressing edge 32 could be pressed inwardly along the short edge of the second panel 1 by for example the tongue 10 of the third panel 1a. The displaceable tongue 31 will now be displaced along the short edges but also into the tongue groove 20 of the new panel 1' and the second 1 and the new panel 1' will be locked horizontally and the risk for edge separation during locking is eliminated. This installation method and locking system is further explained in FIGS. 10a-10d. FIG. 10a shows how a tongue 10 presses the edge section 32 in a direction along the short edge during angling of the long edges. FIG. 10b shows the locked position with the displaceable tongue in its final locked position. The tongue could during locking create a substantial pressure against the pressing edge and the short edges could be locked firmly against each other in the vertical direction. FIG. 10c shows the position of the second 1 and the new panels 1' before their short edges are locked vertically and FIG. 10d shows the locked position when the tongue of the third panel 1a has displaced the displaceable tongue 31 to its final locked position.

It is obvious that the tongue could be displaced with a pressure against the pressing edge, which is applied by the installer during installation, with for example a tool and not by the angling of the third panel. It is also obvious that displaceable tongues could be connected to an edge of the panel during installation.

The invention comprises a method to install floor panels with an angling locking system on long edges and a displaceable tongue on the short edges. The method comprises the step of Connection the long edges of a second 1, and a new panel 1' to a long edge of a first panel 1" in a first row R1 such that the short edges of the second and new panel in the second row R2 are in contact and in essentially the same plane.

Connecting a third panel in a third row R3 with angling to the long edges of the second and new panels whereby a displaceable tongue on the short edge of the second an new panels is displaced such that the short edges are locked vertically and horizontally.

The invention comprises a method to disconnect floor panels with an angling locking system on long edges and a flexible tongue on the short edges as shown in FIGS. 10d and 10c. The flexible tongue 30 could be flexible in such a way that it returns to the initial unlocked position when the sideway pressure P is released as shown for example by the FIG. 14f-14h. The panels are installed and locked as shown in FIG. 10d. The method, which comprises the step below, is described with reference to FIG. 10c.

The method comprises the steps:

1. Disconnecting the long edges 5a of a third panel 1a in a third row from a long edge 5b of a second 1 and new panel 1' in a second row and disconnecting a flexible tongue 30 and the vertical locking between a new panel 1' and a second panel 1 in a second row with angling up of the third panel 1a away from the sub floor.

2. Disconnecting the new panel 1' from the long edges 5b of a first panel 1" in a first row and from the short edges 4a of the second panel 1 with angling up of the new panel 1'.

All the three link, wedge and bend principles could be reversible.

Figure 11A:
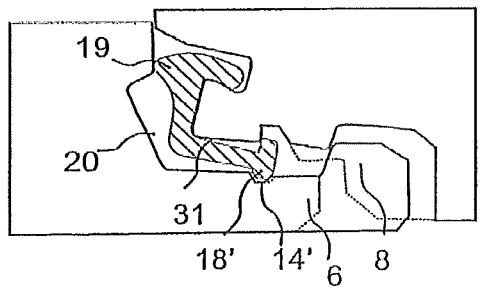
FIG. 11a-d show embodiments according to the first and second aspect of the invention.
Figure 11B:
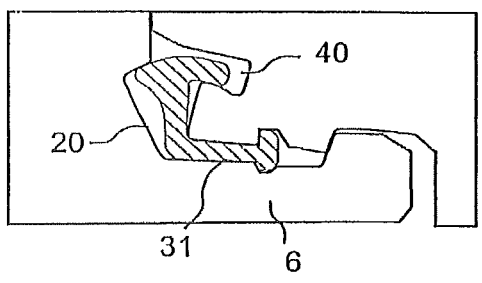
Figure 11C:
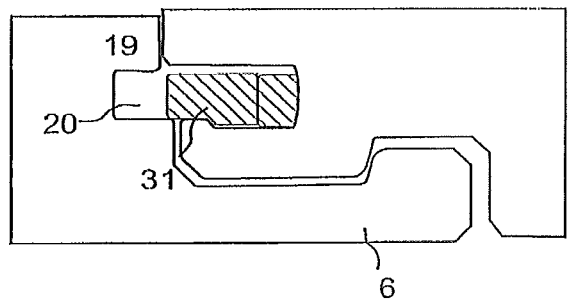
Figure 11D:
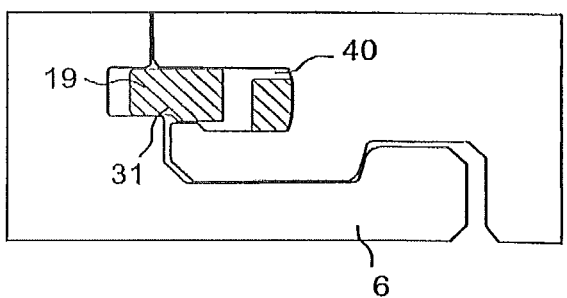

FIGS. 11a-11d are examples, which show that all embodiments of the displaceable and flexible tongues could be adjusted such that they could be alternatively connected to the opposite short edge on the folding panel. It is obvious from the figures that the displaceable tongue 31 as shown in FIG. 9f could be connected into a displacement groove on the new panel 1' which is folded against the second strip panel 1. FIG. 11a shows that the pressing extension 17 could have a downwardly extending press locking element 18' which locks into a locking groove 14' located on the upper part of the strip 6. The dotted line shows that the strip could be made shorter.

Figure 11E:
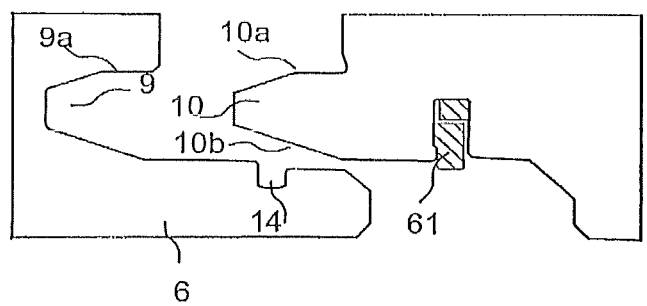
FIG. 11e-g show examples of how the basic principles of the invention could be used to connect panels with horizontal snapping.
Figure 11F:
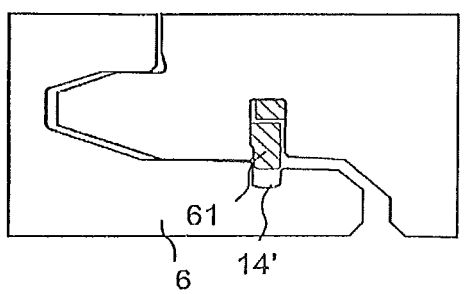
Figure 11G:
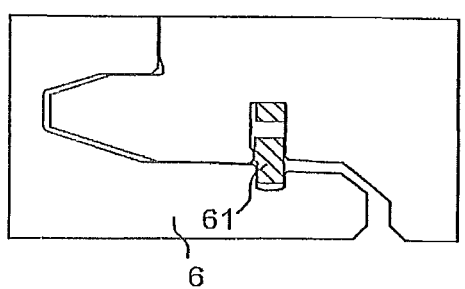

FIGS. 11e-11g is an example that shows that the basic principles of the displaceable tongue and its function and geometry could be used to connect floor panels vertically with an essentially horizontal single snap action. The embodiment show a flexible locking element 61 which is fixed in a groove with pre tension and released during the horizontal displacement of one panel edge against another panel edge. All shown embodiments according the described principles of locking and disconnecting panels could be used to connect and disconnect panels horizontally according the same principles as shown for the vertical folding. It is obvious that all shown flexible or displaceable tongues could be used as flexible or displaceable locking elements 61 which could be displaced vertically instead of horizontally into a locking groove 14. A new panel could be connected according to the principle that it is displaced horizontally locked to a first panel in a first row and preferably along the connected long edges until the top edges of the new and the second panels are in contact and the tongue 10 is in the groove 9 as shown by the FIGS. 11*e-f*. The displaceable locking element 61 could for example be displaced vertically by a third panel 1*a* which is angled to the long edges of the new panel 1' and the second panel 1. The third panel could press against a pressing edge of the displaceable locking element 61 and cause a vertical displacement of a part of the locking element 61. The locking element 61 could for example spring back to its unlocked position when the pressure is released. This allows that the panels could be released by a reverse horizontal displacement away from the short edges. It is obvious that vertical displacements based on the link, wedge and bending principles could be used to lock horizontally. This third principle of the invention could also be combined with the first principle. The edges could have a displaceable tongue and a displaceable locking element. The locking element 61 could be on the lower part 10*b* or on the upper part 10*a* of the tongue 10 and the locking groove 14 could be at an inner part of the strip 6 or in the upper lip. Such an undercut in a locking groove in the upper lip 9*a* could be formed by for example scraping.

The invention comprises therefore according to a third principle a set of essentially identical floor panels each comprising one pair of opposite edges provided with first and second connectors integrated with the floor panels and configured to connect adjacent edges vertically and horizontally. At least one of the first or second connector comprises a separate locking element integrated with the panel and connected to a displacement groove in an unlocked position. The separate locking element is configured to be displaced horizontally or vertically in one direction only from an inner unlocked position and to an outer locked position in order to lock two adjacent edges vertically and/or horizontally.

Such an embodiment will facilitate easy installation since no compression forces have to be overcome in order to press the locking element into a displacement groove in order to accomplish a vertical or horizontal snap action.

All embodiments of the invention could be used on long and/or short edges or on the strip panel and/or the groove panel. The invention does not exclude tongues on both adjacent edges or several tongues on the same edge side by side or over and under each other. The shown locking systems according to the first and second aspect of the invention could be formed such that they could for example be connected by angling and/or snapping. The locking system according to the third aspect of the invention could be locked by horizontal snapping of the long edges whereby for example the tongue on the long edge could press against the pressing edge of the displaceable tongue during the horizontal snapping of the long edges. All embodiments could have a geometry allowing disconnection with angling up. The panels could have edges which are not perpendicular, and they could have more than 4 edges for example 5, 6, 8 edges and even up to 12 edges.

Figure 12A:
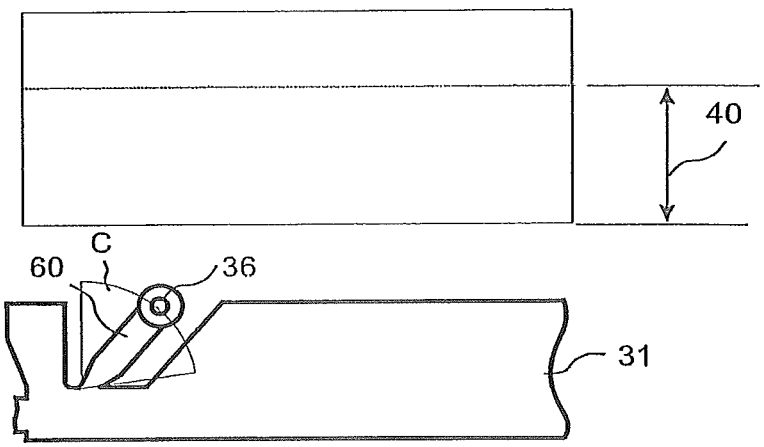
FIG. 12a-d show an edge section of an embodiment of the invention.
Figure 12B:
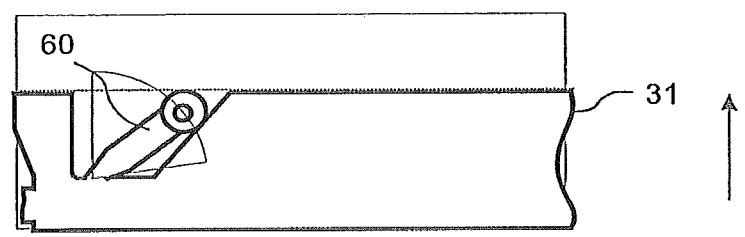
Figure 12C:
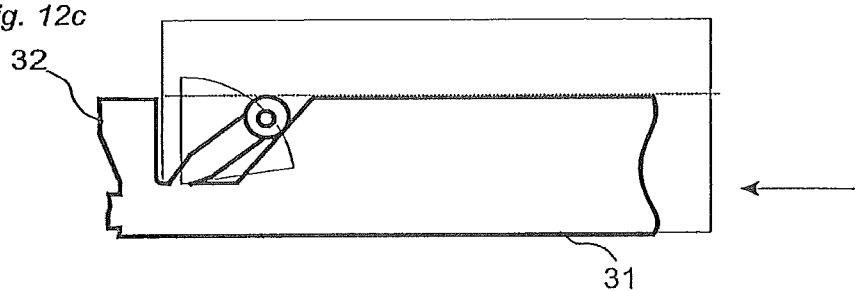
Figure 12D:
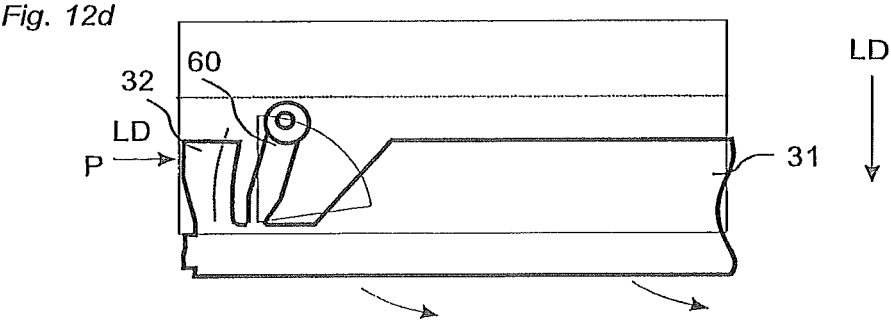

FIG. 12*a*-12 show an edge section of a displaceable tongue 31. FIG. 12*a* shows the displaceable tongue before it is connected into the displacement groove 40. The horizontal protrusion 60 has in this embodiment a friction connection 36 and an angle, to the length direction of the displaceable tongue, of about 50-60 degrees. FIG. 12*b* shows the initial connection of the displaceable tongue 31 during the connection of the tongue to the displacement groove 40. The horizontal protrusion 60 is bent to a lower angle of for example 35-40 degrees. FIG. 12*c* shows a displacement of the displaceable tongue along the joint edge. This displacement will position the displaceable tongue in a correct position in the length direction along the short edge and to a pre-determined position in relation to the long edge of the panel. This displacement will bring the pressing edge 32 in the correct position and eliminate production tolerances. A high quality locking requires that the displaceable tongue and the pressing edge 32 is positioned with high precision preferably with a tolerance not exceeding 1 mm. FIG. 12 shows how the displaceable tongue 31 is displaced in the locking direction LD perpendicularly to the sideway pressure P which is applied parallel to the length direction of the displaceable tongue 31. The horizontal protrusion 60 has in this position an angle of about 70-75 degrees. It bends essentially along a circle C. This is an advantage since the pressing force P in the locking direction could be considerably higher than the locking force in the pressing direction PD. This will create a strong vertical locking and force the short edges to obtain a position in the same plane even in the case that the short edges of the panels are slightly curved in different directions. FIG. 12*d* shows that the pressing edge 32 could be flexible and bendable. This is an advantage and will eliminate production tolerances related to the position and geometry of the displaceable tongue and the locking system. The displaceable tongue could lock with pre tension into the tongue groove 40.

Figure 13A:
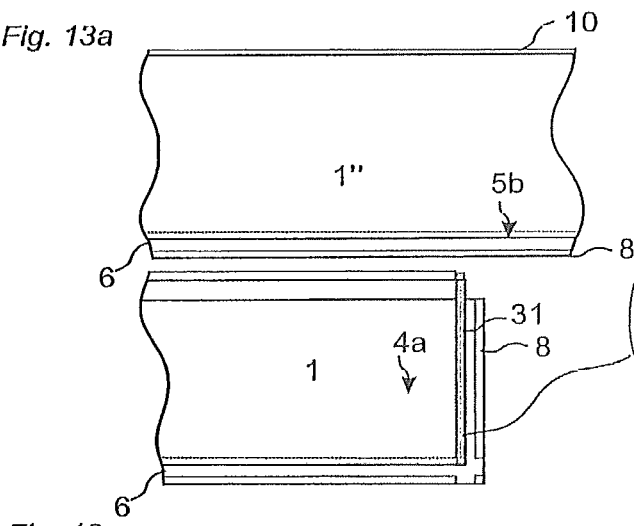
FIG. 13a-f show installation of panels having a flexible tongue according to one preferred embodiment.
Figure 13B:
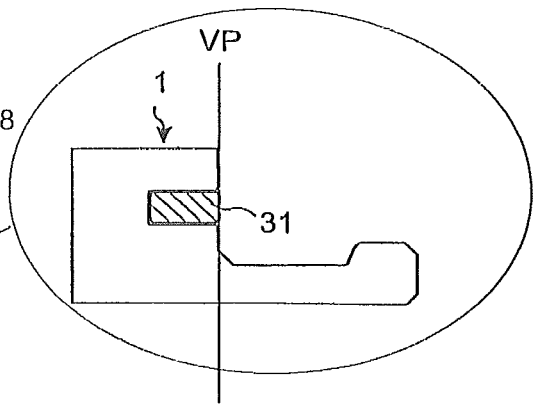
Figure 13C:
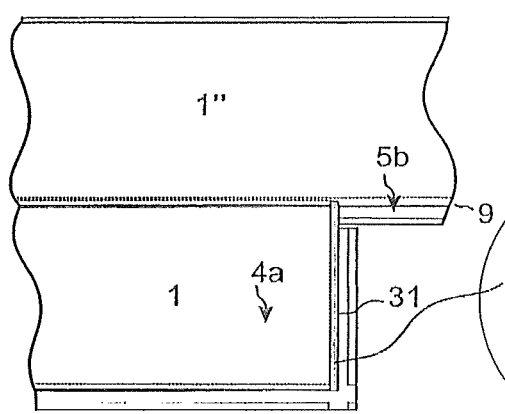
Figure 13D:
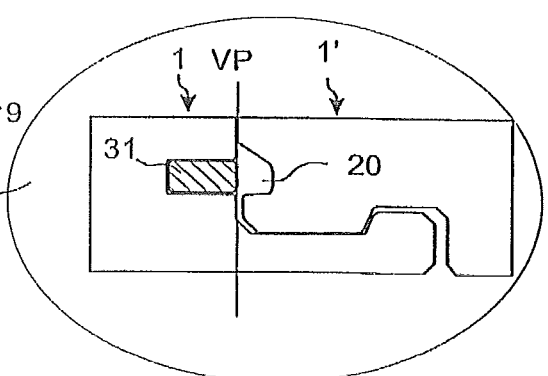
Figure 13E:
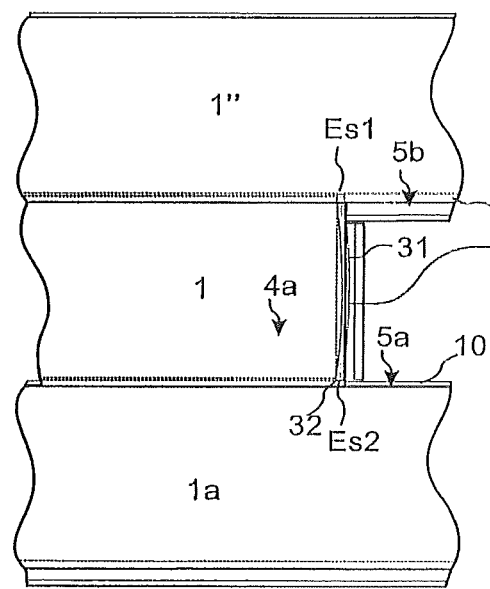
Figure 13F:
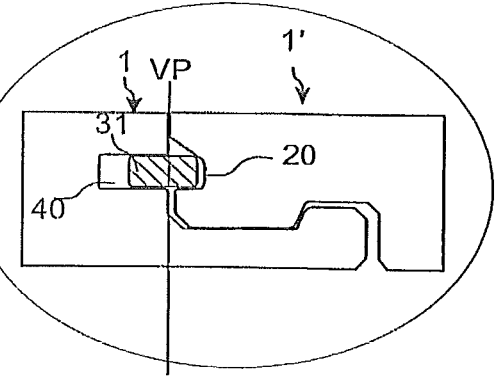

FIGS. 13*a-e* show the function of a displaceable tongue 31 which is made of a very simple component, preferably a extruded or moulded plastic section with a simple and essentially rectangular cross section. FIG. 13*a* show a first panel 1" and a second panel before they are connected. FIG. 13*b* shows a cross section of the short edge 4*a* of the second panel 1. FIG. 13 shows the panels in a connected stage. The displaceable tongue is in the displacement groove 40. FIG. 13*d* shows that a new panel 1'(not shown in FIG. 13*c*) could be moved vertically up and down and that there is no vertical connection that prevents angling up or down of the long edges of a new 1' and a first 1" panel. In order to simplify the description, FIG. 13*e* is shown without the new panel. The connection of the third panel 1*a* to the second panel 1 will press one of the edge sections Es1 towards an edge of the first panel 1", preferably against the inner part of the long edge tongue groove 9, and another of the edge sections Es2, in this case the pressing edge 32, against en edge of the third panel 1*a*, preferably against the long edge tongue 10. The displaceable tongue 31 will bend in a horizontal plane and in a length direction. A part could be displaced into a tongue groove 20 as shown in FIG. 13*f*. The displaceable tongue 31 will revert to the initial position as shown in FIG. 13 *c*, if the third panel 1*a* is disconnected and the pressure on the edge sections Es1 and Es2 is released. This allows the new panel 1' to be discontented by an angling up action. The locking with vertical folding and the disconnection with angling up are preferably carried out along the vertical plane VP with the top edges of the new and the second panels in contact. The bending or displacement should preferably be more pronounced at the edge section Es1 that is opposite to the section Es2 where the side pressure is applied. This gives a stronger lock since friction forces in the length direction of the joint could be reduced and the perpendicular force into the tongue groove could be higher. This means that the bending could start at the edge section Es2 and it could gradually increase towards the press section Es2. The tongue could obtain a locked position such that the major part of the middle section is parallel with the tongue groove. A major advantage compared to the known technology is that a considerably stronger pressure is obtained during the final stage of the locking than during the initial stage. This could be used to lock the edges with strong pre tension. The opposite is present in the known locking systems where the tongue pressure is at its peak when the tongue is in the inner position. It is an advantage if the lower part of the displacement grove 40 is formed in a plane, which is over the top of the locking element, as shown in FIG. 13f FIGS. 14 a-b show that the bending of the displaceable tongue 31 could be facilitated if the displaceable tongue is slightly bended horizontally along the length direction in unlocked position.

FIG. 14c shows a displaceable tongue 31, which in this case also is a flexible tongue, since it is bendable in the length direction. It has a simple and essentially rectangular cross section an at least one friction connection that holds the tongue in the displacement groove during transport and installation. The tongue has a length L and a width direction W. FIG. 14d shows a displaceable tongue 31, which is slightly bended horizontally in a horizontal plane parallel to the main plane of the panels. This facilitates further bending and displacement. FIG. 14e shows that a friction connection could be replaced by a displaceable tongue that is slightly bended vertically perpendicular to the horizontal plane. It is obvious that the tongues could be connected into a displacement groove without any special friction connections or bended forms. A tight fit could be sufficient. Glue is not excluded. All these embodiments could be combined. The tongue could for example be produced such that is slightly bended vertically and horizontally. All these tongues could preferably be formed in a plastic material by injection moulding or by extrusion or simply by punching of a sheet shaped plastic material.

FIGS. 14f-h show another principle to form a displaceable tongue. The tongue has along its length L a middle section S1 that has a smaller width than a part closer to the edge sections Es1, Es2. This facilitates bending. FIGS. 14g and 14h show the bending when a sideway pressure P is applied and released.

Figure 15A:
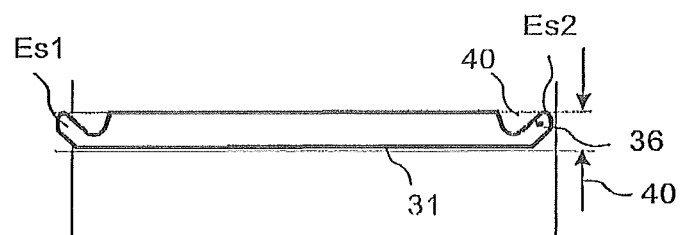
FIG. 15a-f show embodiments of a flexible tongue and a tool to create a sideway pressure.
Figure 15B:
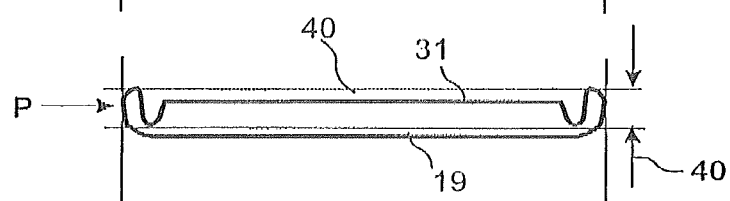
Figure 15C:
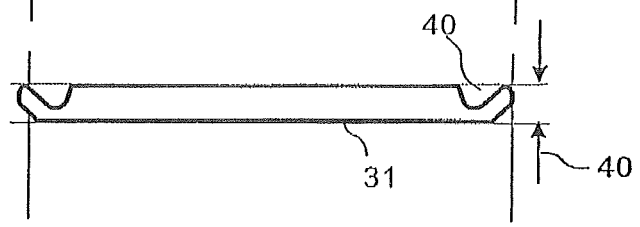

FIG. 15a-c show an embodiment of a displaceable and flexible tongue 31 with flexible edge sections Es1, Es2 which allow that a major part of the tongue is displaced, and that there is a vertical locking element 19 over essentially the major part of the length of the short edge.

Figure 15D:
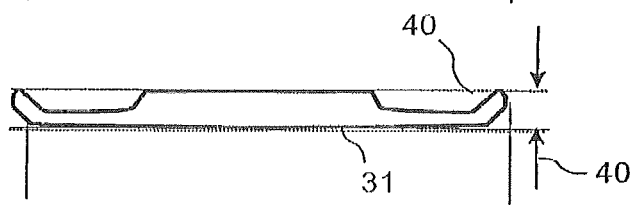
Figure 15E:
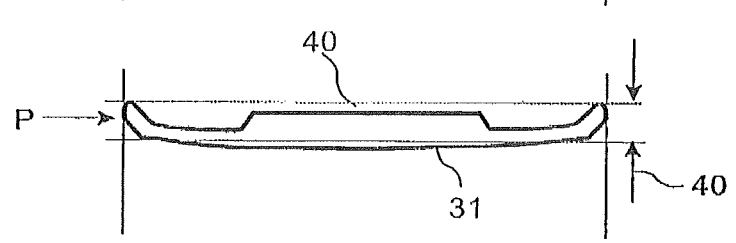

FIG. 15d-e show that flexible edge sections according to FIG. 15a-c and bending according to FIG. 14b could be combined.

Figure 15F:
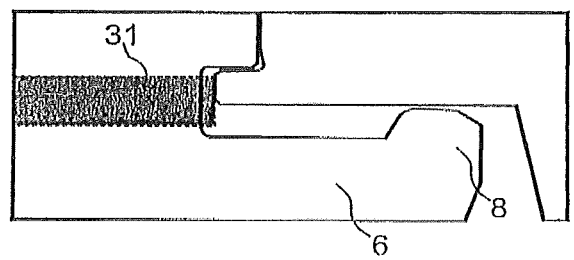

FIG. 15f show that the displaceable tongue could be displaced with a tool that creates the sideway pressure.

Figure 16A:
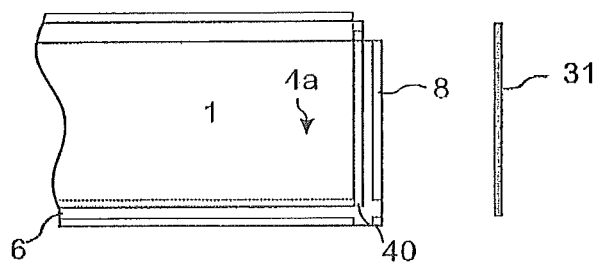
FIG. 16a-e show examples of how a tongue is connected and produced.
Figure 16B:
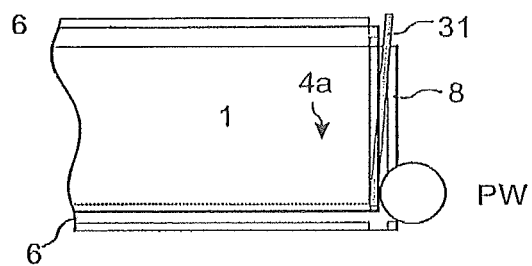
Figure 16C:
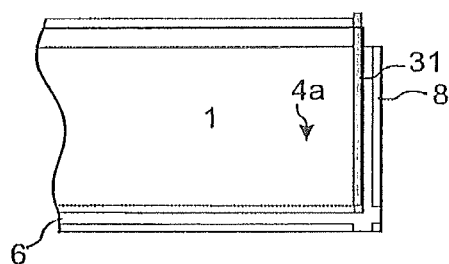
Figure 16D:
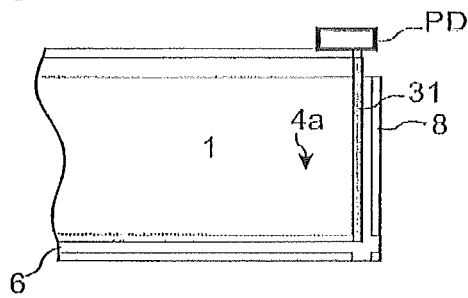

FIG. 16a-16d shows connection of a separate tongue or any similar loose element. A displaceable tongue 31 is connected into a groove 40 at the edge with a pusher that preferably connects one edge of the tongue. FIG. 16b shows that a pressure wheel PW could be used to connect the displaceable tongue 31 further into a groove 40. FIG. 16d show that a position device PD could be used to position the tongue in relation to one long edge. This could be made in line in a continuous flow.

Figure 16E:

FIG. 16e show how a displaceable or flexible tongue 31 could be formed from a tongue blank TB, for example from an extruded section which is punched in order to form and separate the tongues from the extruded tongue blank TB. Friction connections could be formed for example by punching or with heat.

Figure 17A:
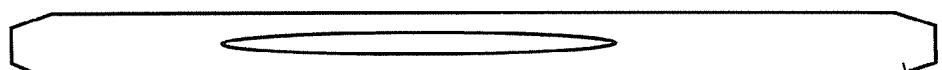
FIG. 17a-j show embodiments of a displaceable tongue.
Figure 17B:
Figure 17C:
Figure 17D:
Figure 17E:
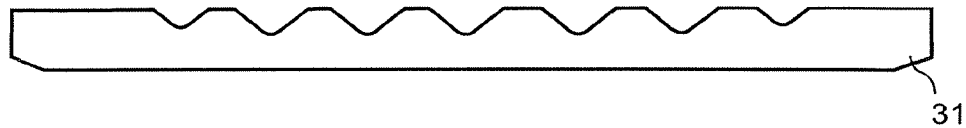

FIGS. 17a-17j show embodiments of flexible and displaceable tongues 31 according to the invention. FIGS. 17a-b show a flexible tongue 30 with a middle section comprising two parts separated from each other in the width W direction. FIGS. 17c-e show tongues where the width W varies along the length L of the flexible tongue 30.

FIGS. 14a-14h, 15a-15e and 17a-17e are all examples of embodiments based on the bending principle.

Figure 17F:
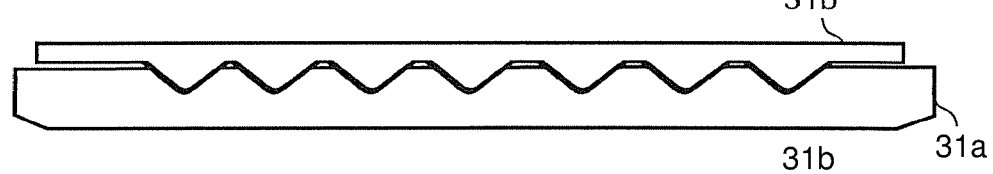
Figure 17G:
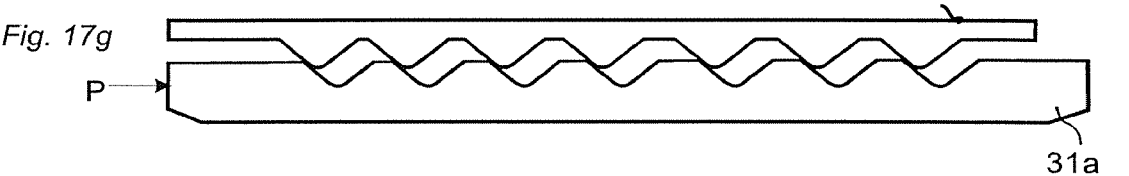

FIG. 17f-g show the wedge principle with a displaceable double tongue with two parts 31a, 31b that comprises cooperating wedges 70 that are displaced and separated from each other in the width direction W when a sideway pressure P is applied.

Figure 17H:
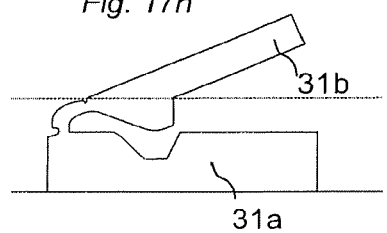
Figure 17I:
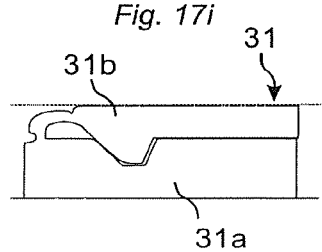
Figure 17J:
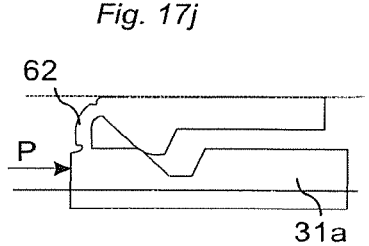

FIG. 17h-17j show an edge section of a double tongue where the two parts 31a and 31b are connected. FIG. 17h shows how such a double tongue could be produced and folded together when connected as shown in FIG. 17i. The connection 62 that connect the two parts could be bended, expanded, compressed or separated from one of the parts when a sideway pressure P is applied.

FIG. 18a-c show an embodiment of the displaceable tongue 31 according to the link principle, which has several horizontal protrusions 60 that during the connection of the tongue to the groove 40 (FIG. 18b) and displacement (FIG. 18c) are rotated around a centre point. The protrusions could be bended and they could be permanently rotated or alternatively flexible such that they could return at least partly to the initial unlocked position when the side pressure is released.

FIG. 18d shows a blank TB of an extruded section with an essentially rectangular cross section comprising one or more friction connections 36 as shown in FIG. 18e.

The embodiments as showed in FIGS. 18f-18i, and which are based on the link principle, shows how rather complex forms with one or several horizontal protrusions comprising a friction connection could be obtained by punching and/or forming a blank of an extruded section.

FIGS. 18h and 18i show that the principles of obtaining a horizontal displacement into a tongue groove with a sideway pressure and with a tongue comprising horizontal protrusions or with a tongue that bends, could be combined. The shown tongue 31 is displaced partly with the horizontal protrusions 60 according to the link principle and partly with a bow shaped part which is displaced according to the bending principle.

Figure 19A:
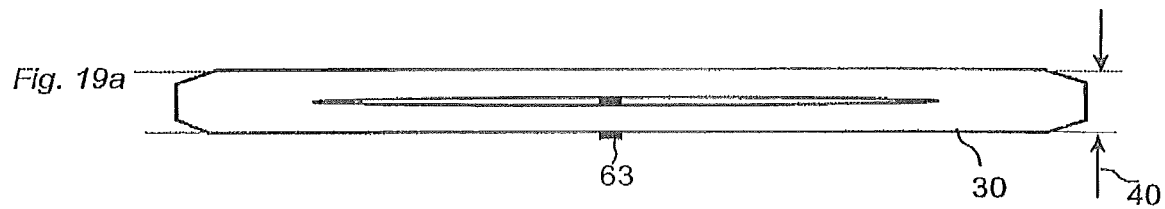
FIG. 19a-e show embodiments of a flexible tongue.
Figure 19B:
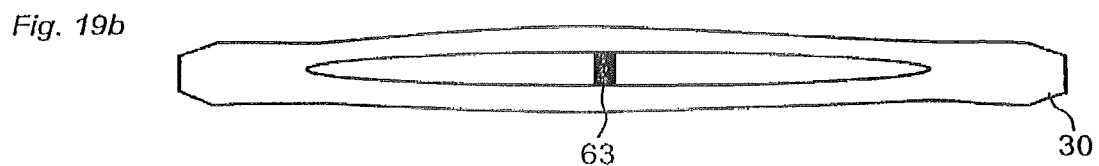

The known technology as described in connection with FIGS. 1-5 could be combined with the embodiments of the invention. Part of a flexible tongue could be pressed into a displacement groove during the vertical folding as shown in for example FIG. 5 and it could thereafter snap back into the tongue groove. A sideway pressure could thereafter be applied and a final and stronger locking could be obtained according to the principles of the invention. Such combinations could also be made with the flexible locking element, which locks horizontally as shown and described in connection to FIGS. 11e-11g FIG. 19a show an embodiment of the pre tension principle where two parts of a flexible tongue 30 are connected under pre tension to each other with a hook 63. FIG. 19b shows the tongue 31 when the pre tension has been released by the hook 63.

Figure 19C:
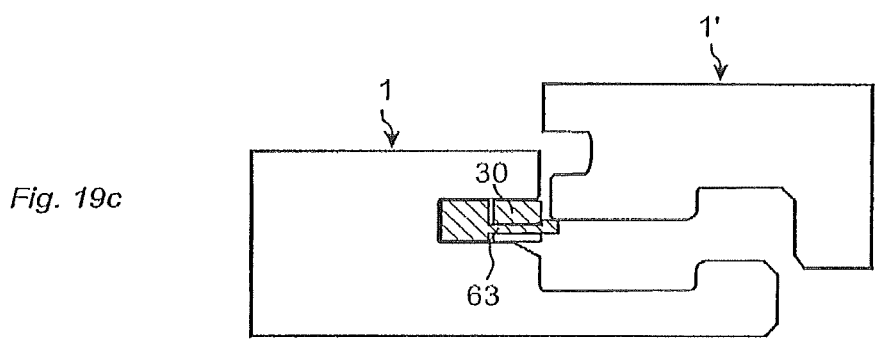
Figure 19D:
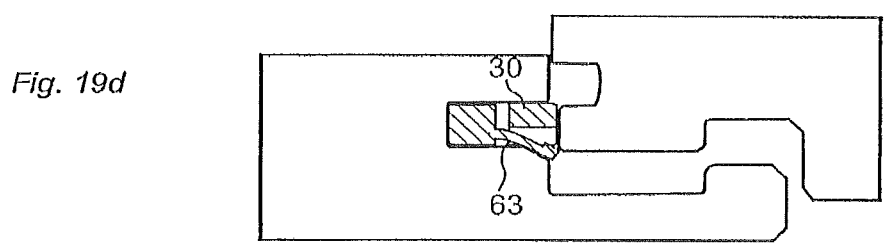
Figure 19E:
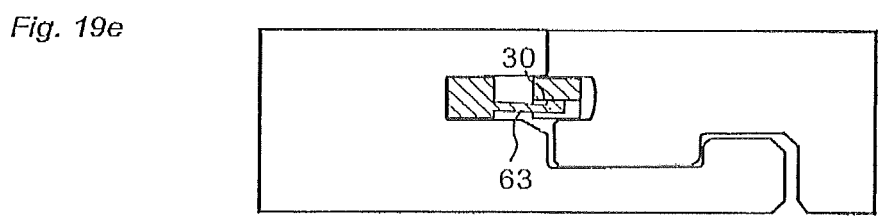

FIG. 19c-19e show that this hook could be released by an vertical pressure caused by an edge of the folding panel 1' and the result is that a part of the tongue 30 springs into the tongue groove.

Figure 20A:
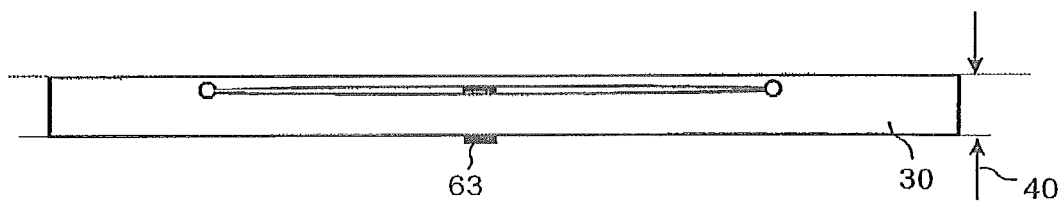
FIG. 20a-c show embodiments of flexible tongues.
Figure 20B:
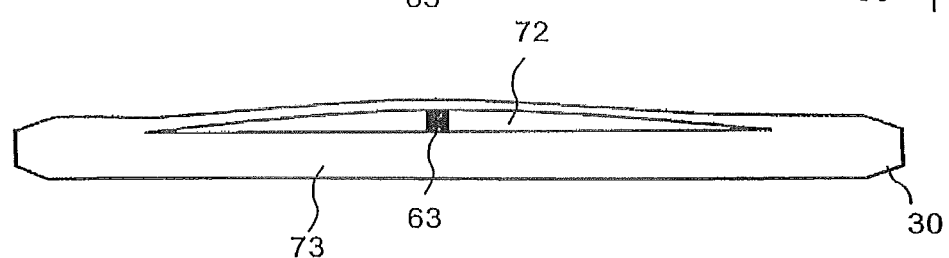

FIGS. 20a-b show an embodiment of the pretension principle where the inner part of the tongue 30 is flexible and pushes an outer rigid part into the tongue groove when the hook 63 has released the pre tension. The flexibility is obtained by a flexible cavity 72

Figure 20C:
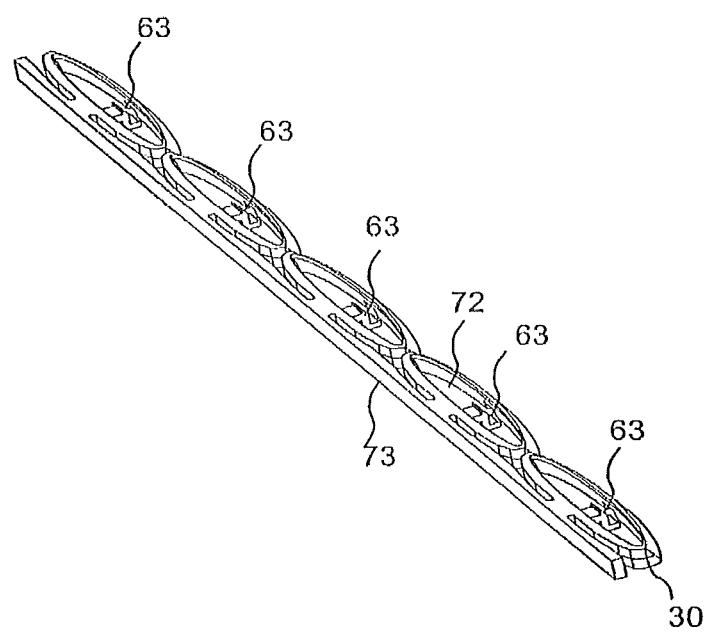

FIG. 20c shows an injection moulded flexible tongue 30 where the displacement is based on the pre tension principle and where several hooks 63 gradually release the pre tension during the vertical folding. Parts of the tongue 31 will gradually be displaced into the tongue groove. It is obvious that such a flexible tongue could be used to lock floorboards without the hooks 63 and with the double action principle where the parts of the tongue are gradually displaced into a displacement groove and back again into the tongue groove according to the known principles associated with vertical folding and described in FIGS. 1-4. The inner groove section with its substantially rigid part 73 could be permanently connected into the displacement groove with strong friction or pre tension or it could alternatively be glued into a groove. The tongue could have several flexible cavity sections 72. They could be connected on one or both sides with rigid parts 73—one in the inner part of the displacement groove and one in the outer part—that locks into a tongue groove.

It is also obvious that flexible tongues could be made according to for example the embodiments 17b, 19b and 20b such that they could be compressed and such that they could be used to lock floorboards according to the principles described in FIG. 1-4 where a part of the flexible tongue is bent in length direction during the vertical folding. A tongue 30 could as shown in FIG. 20b have an inner flexible part 72 and a rigid outer part 73 that locks into a tongue groove when the flexible part 72 is compressed during the vertical folding to a position as shown in FIG. 20a. The tongue 30 could of course have several such flexible section 72 along its length that are bent and compressed in the length direction of the tongue. Such a principle is shown in FIG. 25 a,b.

FIG. 21a and show an embodiment according to the wedge principle where a wedge part 70 is separated from the displaceable tongue during the displacement into the groove 40. FIG. 21b show a tongue 31 where several parts are separated during displacement.

FIG. 21c show an injection moulded tongue 31 with several horizontal protrusions 60 according to the link principle where the thickness and the width of the tongue varies along the length.

FIG. 21d show a tongue 30 with several bow shaped parts that could be displaced according to the bending principle.

Figure 22A:
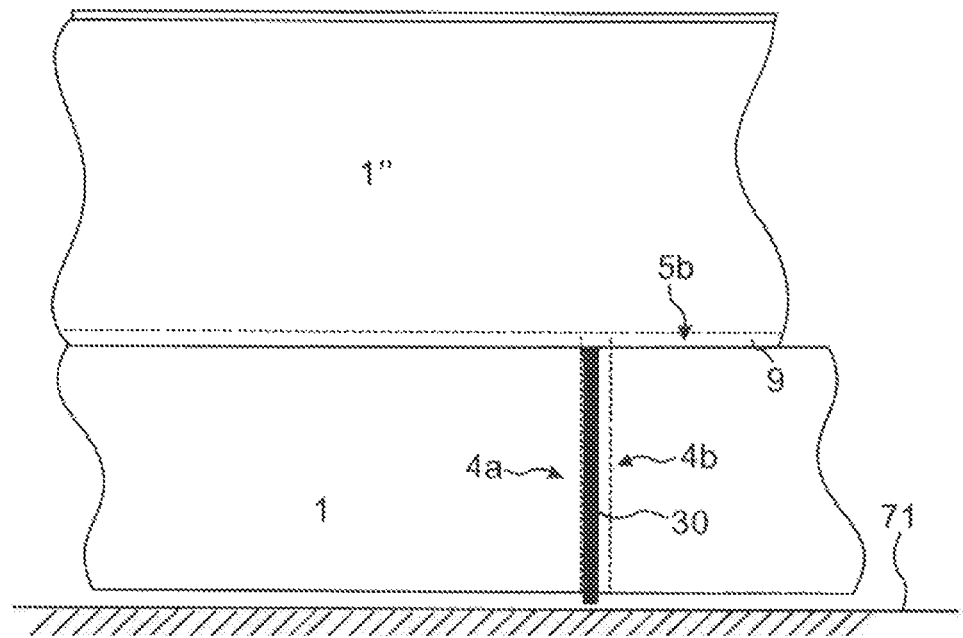
FIG. 22a,b show installation of a last row.
Figure 22B:
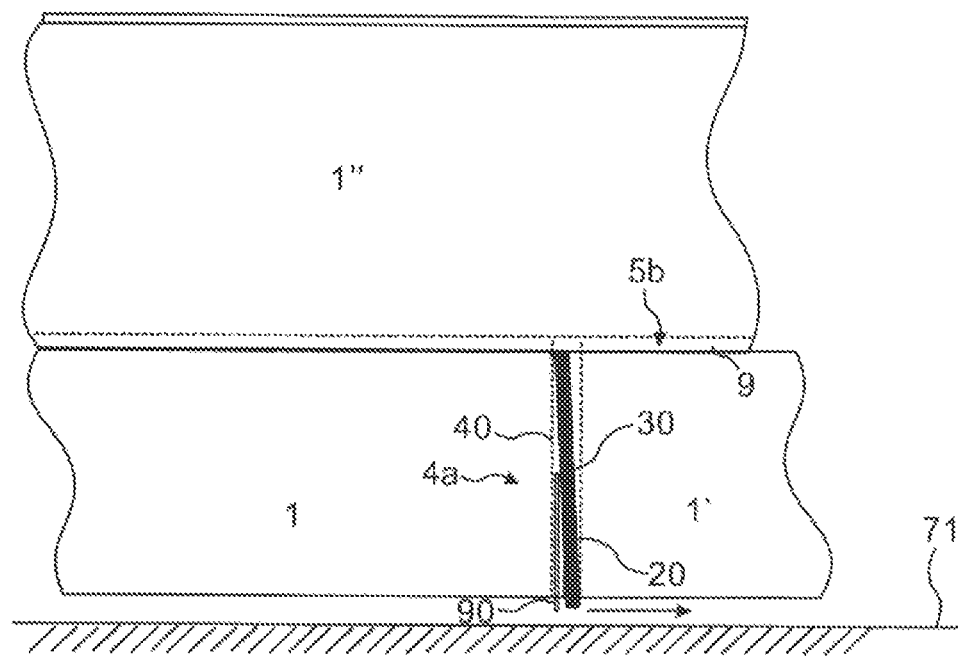

FIGS. 22a and 22b show how the last row close to a wall 71 could be locked if the tongue 30 for example is made according to the bending principle. The outer part of the tongue 30 is displaced sideway by a simple tool. This method could also be used for the first row. Alternatively a needle shaped tool 90 could be inserted into the displacement groove in order to displace the tongue. A friction connection or similar at one edge could be used to lock the first row in the same way as for all other panels. Most of the embodiments according to the wedge and link principles are displaceable in the first row in the same way as for other rows.

FIG. 23a-23c show an embodiment according to the wedge principle that consist of two parts 31a and 31b, which are folded together and connected to one component with one or several wedge hooks 77. Displacement, production tolerances and pressure forces could be controlled in a very precise way with curved and/or flexible wedges 70a, 70b and locking parts 78a, 78b that lock along the joint and which cooperate with each other in order to facilitate a controlled displacement into a tongue groove. Complex, advanced and cost effective features could be accomplished with preferably injection mouldings. In a preferred embodiment, the two parts are produced in the same mould.

The shown embodiments are only examples. An "unlimited" number of alternatives could be made with combinations of the shown embodiments and generally known principles.

Figure 24A:
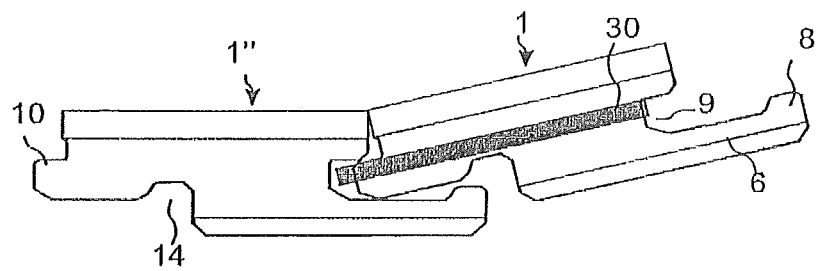
FIG. 24a-d show installation of panels according to the bending principle with a flexible tongue.
Figure 24B:
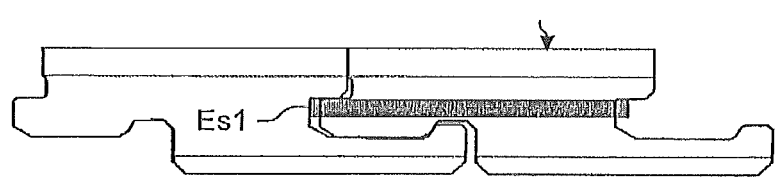
Figure 24C:
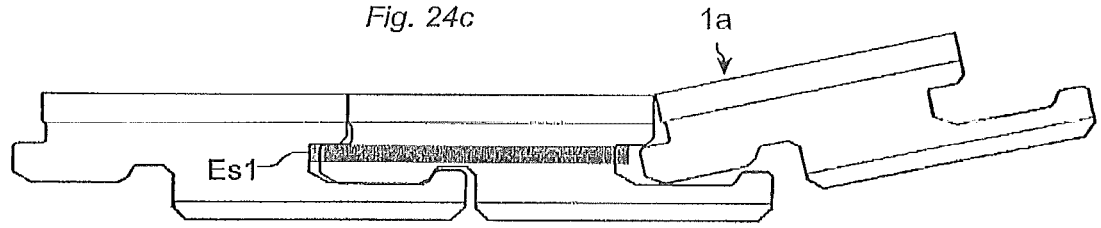
Figure 24D:
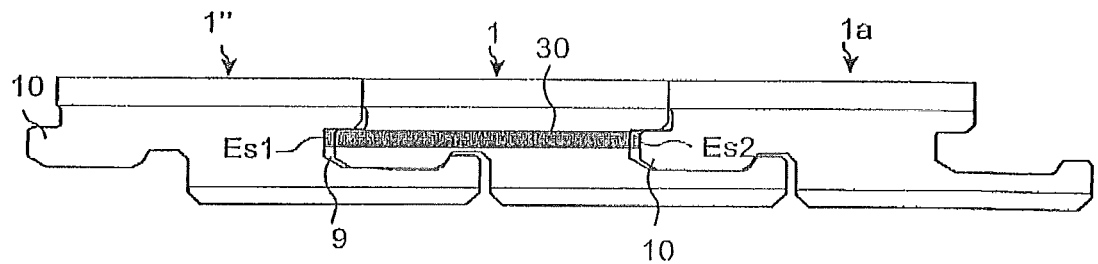

FIGS. 24a-24d show locking of a floorboard which in this case is a wood flooring and the displacement is according to the bending principle. The tongue 30 is in this embodiment fixed to the floorboard such that it protrudes slightly outside the long edge tongue 9. When the flexible tongue 30 comes into contact with the inner part of the tongue groove 10 it is displaced along the joint as shown in FIG. 24b. The third panel 1a is connected with angling and its tongue 10 presses against the pressing edge 32 of the flexible tongue 30. FIG. 24d shows how the tongue 31 is compressed with one of its edge sections Es1 in contact with the inner part of the long edge groove 9 of the first panel 1″ and the other edge section Es2 in contact with the tip of the tongue 10 of the third panel 1a. The bending principle allows that the floor could be installed in both directions—with the long edge tongue part on the strip or with the long edge strip under the tongue. It could be mentioned that a compression of about 0.5 mm could results in a tongue bending of about 2 mm. Even with production tolerances of some 0.1 mm for the flexible tongue 30 and for the machining of the floorboard 1, the tongue 10 and the groove 9, it is possible to obtain a high quality lock mainly due to fibre compression and the fact that the bow shaped form is converted to a straight line when pressure and displacement along the joint increases.

FIG. 25a shows a new embodiment of a flexible tongue that could be used to lock floorboards with vertical folding according to the known principle where the tongue is displaced inwardly by an edge during the vertical folding. The displacement is caused by flexible cavities 72 which are possible to compress and bend. FIG. 25a shows the outer locked position of a flexible tongue 30 and FIG. 25b the inner compressed and unlocked position. The tongue has in this embodiment a rigid outer part 73 that locks into a tongue groove when the flexible part 72 snaps towards the initial position. The flexible tongue 30 could of course have several such flexible cavity section 72 along its length that are bent and compressed in the length direction of the tongue.

Figure 26A:
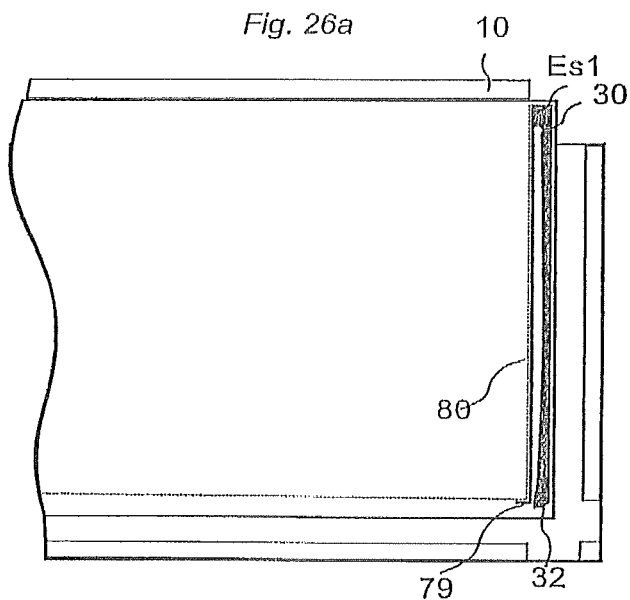
FIG. 26a-c show a flexible tongue which prevents with means that prevent displacement along to edge.
Figure 26B:
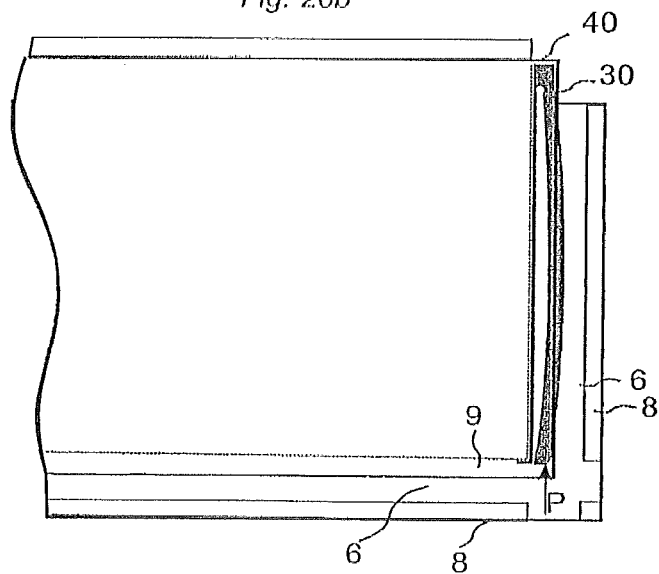

FIG. 26a show an embodiment, which could be used to position and fix the displaceable tongue in order to prevent displacement of the tongue along the joint when the side pressure is applied. This embodiment allows that even panels in the first row could be locked with bending of the tongue. The displaceable tongue has a side hook 79 which locks for example against the inner part of the long edge groove 9. The side hook is via an extension 80 connected to an edge section Es1 of the tongue opposite to the pressing edge 32. This side hook 79 is also used to position the tongue 30 and the pressing edge 32 in a correct position against the long edge. FIG. 26b shows the bending when the side pressure P is applied. Side hooks and positioning elements could be applied on both long edges as an alternative to the previous mentioned friction connection. A side hook could for example be applied in the locking groove of a long edge.

Figure 26C:
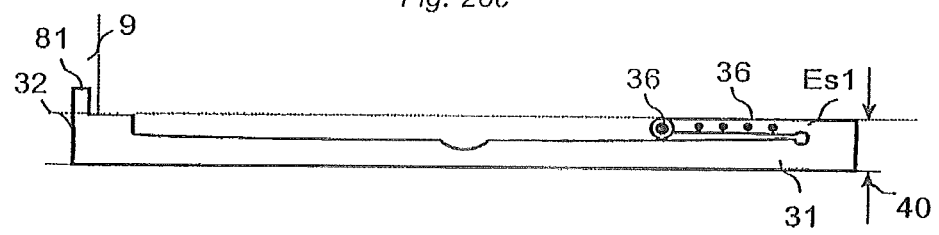

FIG. 26c shows an embodiment with friction connections 36, which prevents displacement along the edge. Parts of the tongue could also be glued to the edge. The pressing edge has a fixing protrusion 81, which extends along a groove of the long edge. This protrusion could be used in for example wood floors with a lamella core in order to over bridge spaces between the lamellas and to make sure that a tongue part always presses against the pressing edge 32.

FIG. 27 shows a schematic illustration of an embodiment of a needle shaped tool.

The displacement of a tongue according to the wedge principle could also be made with a displacement groove that has one or several parts formed like wedges. This means that the depth and/or thickness of the displacement groove will vary along the length of the edge.

The invention claimed is:

1. Method of locking a set of floor panels provided with a locking system comprising a separate flexible tongue arranged in a displacement groove at an edge of one floor panel, and a tongue groove at an adjacent edge of a similar floor panel, wherein the method comprises the step of inserting a needle shaped tool into the displacement groove and displacing the flexible tongue into the tongue groove to obtain a vertical locking of the edge of the one floor panel and the adjacent edge of the similar floor panel.

2. The method as claimed in claim 1, wherein the locking system comprises a friction connection.

3. The method as claimed in claim 1, wherein the one floor panel and the similar floor panel are installed in last row adjacent to a wall.

4. The method as claimed in claim 1, wherein the one floor panel and the similar floor panel are installed in a first row adjacent to a wall.

5. The method as claimed in claim 1, wherein the flexible tongue is bendable.

6. The method as claimed in claim 2, wherein the friction connection is on the flexible tongue.

7. The method as claimed in claim 1, wherein the displacing of the flexible tongue is by a bending principle.

8. The method as claimed in claim 1, wherein the displacing of the flexible tongue is by a link principle in which a portion of the flexible tongue is rotated around a point.

9. The method as claimed in claim 1, wherein the displacing of the flexible tongue is by a wedge principle.

10. The method as claimed in claim 1, wherein the one floor panel and the similar floor panel are configured to be locked with angling or a vertical motion.

11. The method as claimed in claim 1, wherein the displacing of the flexible tongue causes at least a part of the flexible tongue to be bent in a length direction of the flexible tongue.

* * * * *